United States Patent
Kumahara et al.

(10) Patent No.: US 10,222,272 B2
(45) Date of Patent: Mar. 5, 2019

(54) SEMICONDUCTOR DEVICE AND ELECTRONIC APPARATUS

(75) Inventors: Chiaki Kumahara, Kanagawa (JP); Akira Tsurugasaki, Kanagawa (JP)

(73) Assignee: Renesas Electronics Corporation, Tokyo ( * ) Notice: Subject to any disclaimer, the term of this patent is extended or adjusted under 35 U.S.C. 154(b) by 765 days.

(21) Appl. No.: 14/417,004

(22) PCT Filed: Jul. 24, 2012

(86) PCT No.: PCT/JP2012/004712
§ 371 (c)(1),
(2), (4) Date: Jun. 10, 2015

(87) PCT Pub. No.: WO2014/016867
PCT Pub. Date: Jan. 30, 2014

(65) Prior Publication Data
US 2015/0268101 A1 Sep. 24, 2015

(51) Int. Cl.
*G01K 7/01* (2006.01)
*G06F 1/3234* (2019.01)
*G01K 15/00* (2006.01)

(52) U.S. Cl.
CPC .............. *G01K 7/01* (2013.01); *G01K 15/007* (2013.01); *G06F 1/325* (2013.01); *G01K 2215/00* (2013.01)

(58) Field of Classification Search
CPC . G01K 7/01; G01K 15/007; B81B 2201/0278
See application file for complete search history.

(56) References Cited

U.S. PATENT DOCUMENTS 6,134,167 A * 10/2000 Atkinson .......... G11C 11/40626
365/222
6,363,490 B1 3/2002 Senyk
(Continued)

FOREIGN PATENT DOCUMENTS

CN 1345425 A 4/2002
CN 1426265 A 6/2003
(Continued)

OTHER PUBLICATIONS

International Search Report from International Patent Application No. PCT/JP2012/004712, dated Oct. 9, 2012.
(Continued)

*Primary Examiner* — Marc Armand
*Assistant Examiner* — Sarah Salerno
(74) *Attorney, Agent, or Firm* — Shapiro, Gabor and Rosenberger, PLLC

(57) ABSTRACT

In one embodiment, a semiconductor device (20) includes a semiconductor chip (200) in which functional blocks (201, 202, 203 etc.) and a temperature sensor (208) are integrated. In this embodiment, in response to a change in an operation state of the semiconductor device (20), the on-chip temperature sensor (208) operates to switch from a continuous operation in which it continuously measures a chip temperature to an intermittent operation in which it intermittently measures the chip temperature, or to change a time interval between intermittent measurements of the chip temperature.

10 Claims, 18 Drawing Sheets

(56) References Cited

U.S. PATENT DOCUMENTS

| | | | |
|---|---|---|---|
| 2004/0041762 A1* | 3/2004 | Naiki | G09G 3/3696 345/87 |
| 2007/0090401 A1 | 4/2007 | Baumann et al. | |
| 2008/0022140 A1 | 1/2008 | Yamada et al. | |
| 2008/0137399 A1 | 6/2008 | Chan et al. | |
| 2010/0213919 A1* | 8/2010 | Takayanagi | G06F 1/206 323/318 |
| 2011/0006190 A1 | 1/2011 | Alameh et al. | |

FOREIGN PATENT DOCUMENTS

| | | | |
|---|---|---|---|
| CN | 101853565 | A | 10/2010 |
| CN | 102474542 | A | 5/2012 |
| JP | 2004-6446 | A | 1/2004 |
| JP | 2006-221484 | A | 8/2006 |
| JP | 2008-123016 | A | 5/2008 |
| JP | 2012-4582 | A | 1/2012 |
| TW | 201039104 | A | 11/2010 |

OTHER PUBLICATIONS

Office Action dated May 18, 2017, in Chinese Patent Application No. 201280074887.8.
Office Action dated Nov. 17, 2017, in Taiwanese Patent Application No. 102115909.
Office Action dated May 19, 2015, in Japanese Patent Application No. 2014-526611.
Office Action dated Sep. 13, 2016, in Chinese Patent Application No. 201280074887.8.

* cited by examiner

SEMICONDUCTOR DEVICE AND ELECTRONIC APPARATUS

TECHNICAL FIELD

The present application relates to a semiconductor device and an electronic apparatus such as a wireless communication terminal using the same.

BACKGROUND ART

Patent Literature 1 discloses a technique that divides a semiconductor chip (die) into a plurality of circuit blocks and controls power supply for each circuit block. For example, leakage current is reduced by stopping power supply to an unnecessary circuit block that is not operating. Thus, this technique can contribute to lower power consumption of semiconductor integrated circuit devices (e.g., IC (Integrated Circuit), LSI (Large Scale Integration), system LSI, and SoC (System on a Chip) device).

CITATION LIST

Patent Literature

[Patent Literature 1] Japanese Unexamined Patent Application Publication No. 2012-4582

SUMMARY OF INVENTION

Technical Problem

The inventors of this application have found various problems in the course of developing semiconductor devices (semiconductor integrated circuit devices) such as a system LSI (SoC device) for wireless communication terminals. To address these problems, technical ideas obtained by the inventors of this application contribute to providing a semiconductor integrated circuit device that can be suitably used for a wireless communication terminal or the like and a wireless communication terminal using the semiconductor integrated circuit device. Several specific examples of these technical ideas will be apparent from the description of the below-described embodiments and the accompanying drawings.

Solution to Problem

In one aspect, a semiconductor device includes a semiconductor chip in which a temperature sensor is integrated. The temperature sensor includes a circuit that is configured to be able to intermittently generate a sensor signal based on a chip temperature of the semiconductor chip.

Advantageous Effects of Invention

According to the above aspect, it is possible to provide a semiconductor device that can be suitably used for a wireless communication terminal or the like and an electronic apparatus such as a wireless communication terminal using the semiconductor device.

DESCRIPTION OF EMBODIMENTS

Figure 1:
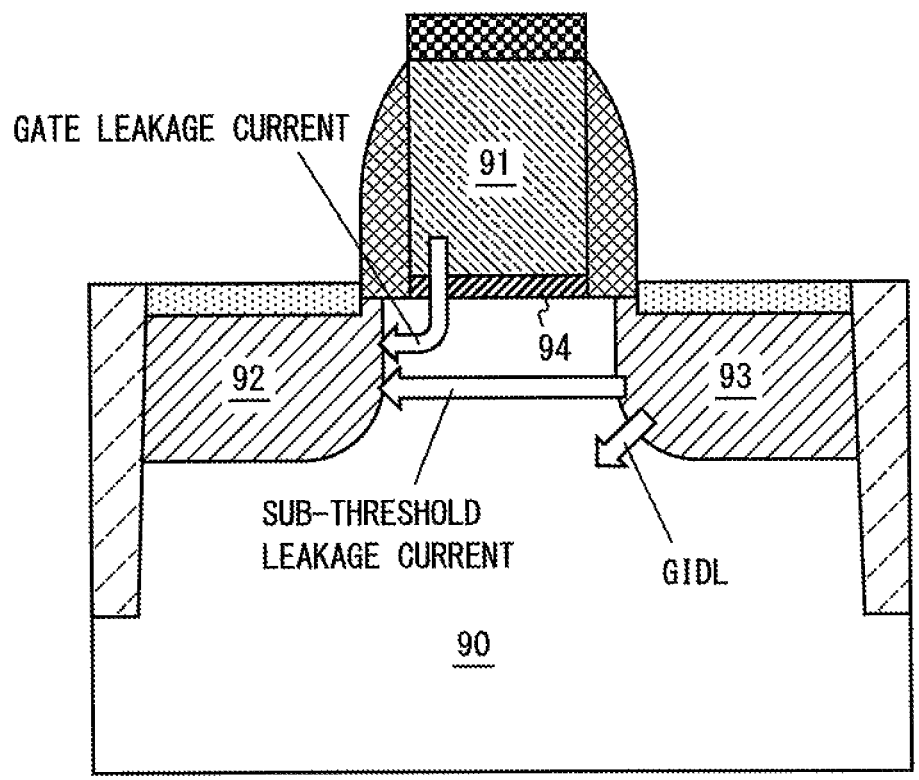
FIG. 1 is a cross-sectional view of a transistor to illustrate leakage current.

Specific embodiments of the present invention will be described hereinafter in detail with reference to the drawings. It is noted that in the description of the drawings, the same elements will be denoted by the same reference symbols and redundant description will be omitted as appropriate to clarify the explanation.

<Description of Comparative Example>

First, a semiconductor device according to a comparative example that has studied by the inventors of this application is described hereinbelow. With the development of micro-fabrication technology, high-functionality and high-efficiency, power consumption and heat generation are increasing in a semiconductor device such as a SoC device for a wireless communication terminal. To prevent thermal runaway of a semiconductor device, a configuration where a temperature sensor is placed on a semiconductor chip together with other functional blocks so that the temperature of the semiconductor chip is measured by the on-chip temperature sensor is known. Note that the thermal runaway is the state where the internal temperature of the IC package continues to increase due to heat generation rate exceeding heat dissipation rate. Further, as described earlier, reduction of power consumption is a major problem to be addressed. On the other hand, because the on-chip temperature sensor includes analog modules such as a BGR (Band Gap Reference), a comparator and an output buffer, there is a limit to reduce power consumption during operation. It is thus considered that the operation of the on-chip temperature sensor is stopped when there is no need to measure the temperature.

With the above as a backdrop, the semiconductor device according to the comparative example that has studied by the inventors of this application includes the on-chip temperature sensor. The semiconductor device according to the comparative example supplies power to the on-chip temperature sensor and continuously measures the chip temperature in a first operation state (high power consumption state) where power consumption of the whole device is high and the possibility of thermal runaway is high. Note that, in this specification, the operation that the on-chip temperature sensor to which power is supplied at all times continuously measures the chip temperature is referred to as "continuous operation". On the other hand, in a second operation state (low power consumption state) where power consumption of the whole device is low and the possibility of thermal runaway is low, the semiconductor device according to the comparative example stops the operation of the on-chip temperature sensor and stops power supply to the analog modules of the on-chip temperature sensor. When the semiconductor device is in the second operation state, the number of circuits in operation (e.g., circuit modules, functional blocks, macros or IP cores) is smaller than those during the first operation state, and therefore power consumption is lower than during the first operation state.

In the case where the semiconductor device is a SoC device for a wireless communication terminal, the operation state where wireless data communication, video playback and the like are performed (e.g., a normal operating state, communicating state (connecting state), video playing state, or a maximum operating state) corresponds to the first operation state. For example, during the first operation state, the SoC device supplies power to functional blocks with high power consumption, such as an application processor, an image processor and a baseband processor, and operates those functional blocks. On the other hand, the standby state of the SoC device for a wireless communication terminal corresponds to the second operation state. In the standby state, the SoC device only performs the limited operations including discontinuous reception to respond to paging from a wireless communication network. Therefore, the SoC device in the standby mode can stop power supply to the application processor (or part of it) and the image processor or reduce the power supply voltage to them while operating the baseband processor (or part of it) to detect paging.

<Consideration Based on Thermal Analysis Simulation>

However, the inventors of this application have conducted detailed studies based on thermal analysis simulations and found that there is a possibility that thermal runaway occurs in a semiconductor device even in a low power consumption state such as a standby state. This is mainly caused by an increase in leakage current. The leakage current is described with reference to FIG. 1. FIG. 1 is a cross-sectional view of a MOSFET. With decrease in the threshold voltage of MOSFETs (Metal-Oxide-Semiconductor Field-Effect Transistors), sub-threshold leakage current that flows between a drain 93 and a source 92 increases when the MOSFET is off. The sub-threshold leakage current has large temperature dependence, and the sub-threshold leakage current thus increases as the junction temperature (channel temperature) of the MOSFET increases. Further, as a gate insulating film 94 becomes thinner due to micro-fabrication of MOSFETs, gate leakage current (gate tunnel current) and GIDL (Gate-Induced Drain Leakage) increase. The gate leakage current flows between a gate 91 and a silicon substrate 90 (or between the gate 91 and the source 92 or between the gate 91 and the drain 93) because electrons pass through the gate insulating film by tunnel effect. The GIDL flows through the drain 93 and the substrate 90 because an electric field between the gate 91 and the drain 92 causes tunnel effect.

Figure 2:
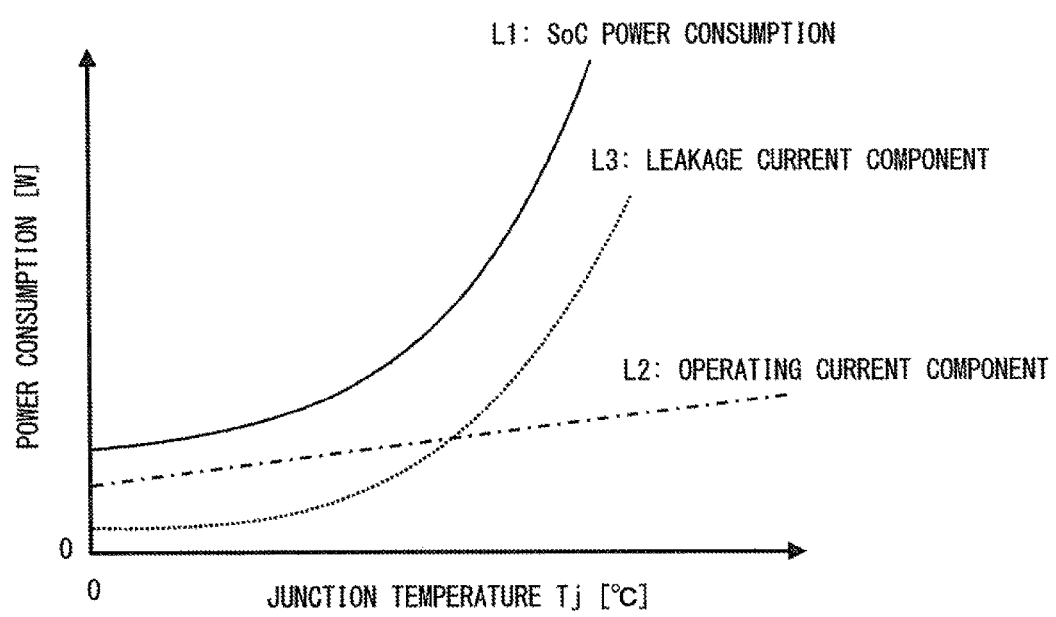
FIG. 2 is a graph illustrating power consumption of a SoC device according to a comparative example.

FIG. 2 is a graph showing the relationship between power consumption and a junction temperature (channel temperature) Tj in a maximum operating state of a certain SoC device for a wireless communication terminal which is obtained by a thermal analysis simulation on the SoC device. The solid line L1 in FIG. 2 indicates the total power consumption of the SoC device. The total power consumption of the SoC device includes power consumption arising from current that flows during operation of the SoC device (operating current component) and power consumption arising from leakage current (leakage current component). The alternate long and short dashed line L2 in FIG. 2 indicates the operating current component, and the dotted line L3 indicates the leakage current component. As is understood from FIG. 2, the leakage current component (L3) exceeds the operating current component (L2) when the junction temperature becomes high.

Figure 3:
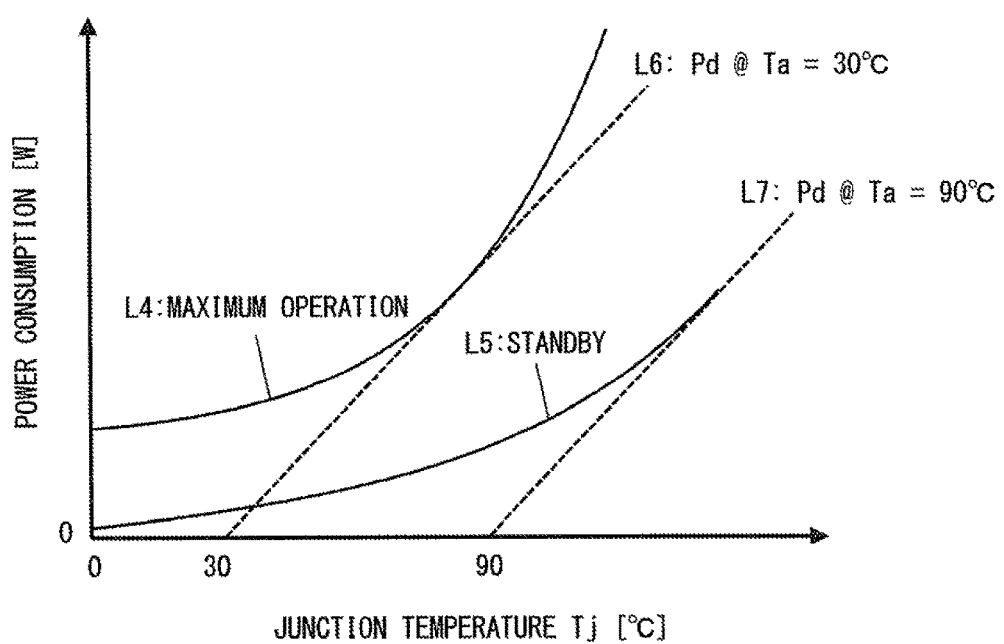
FIG. 3 is a graph illustrating power consumption of a SoC device according to a comparative example.

FIG. 3 shows power consumption (L4 in FIG. 3) in the maximum operating state of the SoC device, which is the same as that in FIG. 2, and power consumption (L5 in FIG. 3) in the standby state of the SoC device. Further, the two straight dashed lines L6 and L7 in FIG. 3 indicate a maximum permissible power Pd when an ambient temperature Ta is 30° C. and 90° C., respectively. The maximum permissible power Pd is defined by the following equation (1):

$$Pd=(Tj-Ta)/\theta ja \qquad (1)$$

where Tj is the junction temperature, Ta is the ambient temperature, and θja is the thermal resistance [° C./W] between the junction temperature (Tj) and the ambient temperature (Ta).

The SoC device can go into thermal runaway in the environment where there is no intersection between the curved line (L4 or L5) indicating power consumption of the SoC device and the straight line (L6 or L7) indicating the maximum permissible power Pd. In other words, the SoC device in FIG. 3 can go into thermal runaway when the ambient temperature Ta reaches about 90° C. even in the standby state.

As is apparent from the above description, the semiconductor device according to the comparative example, where the on-chip temperature sensor continuously operates during the first operation state (e.g., a normal operating state, a communicating state (connecting state), a video playing state, or a maximum operating state.) and the on-chip temperature sensor stops operating during the second operation state (e.g., a low power consumption state or a standby state), has a problem that it can suffer thermal runaway during the second operation state. One approach to address this problem is to make the on-chip temperature sensor continuously operate during the second operation state just like during the first operation state. However, this approach fails to achieve reduction of power consumption during the second operation state.

In view of the foregoing, the inventors of this application have conducted studies on configurations and operations of semiconductor devices (e.g., SoC devices) that can suppress an increase in power consumption during the second operation state while an on-chip temperature sensor measuring a temperature in. The inventors have focused attention on the fact that the chip-temperature increasing speed (increasing rate) during the second operation state is lower than that during the first operation state since the power consumption and heat generation of the whole device during the second operation state are lower than those during the first operation state. In one embodiment according to the technical idea obtained by the inventors of this application, a semiconductor device has a configuration in which an on-chip temperature sensor intermittently measures a chip temperature. This embodiment is described hereinbelow.

First Embodiment

<Overview of Wireless Communication Terminal (Electronic Apparatus)>

Figure 4A:
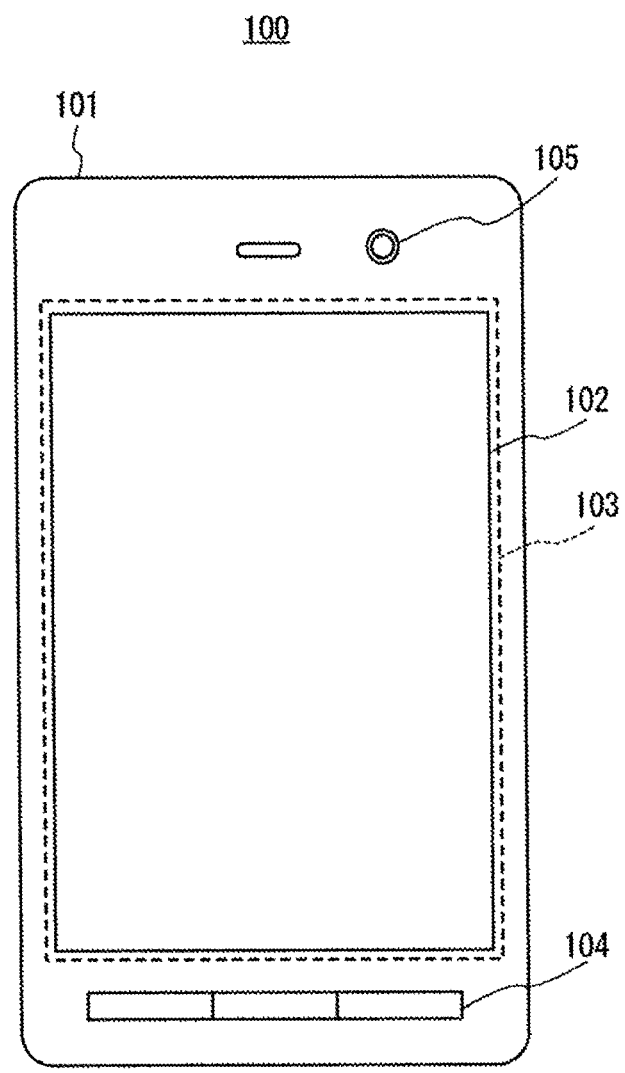
FIG. 4A is an outline view showing a configuration example of a wireless communication terminal according to an embodiment.
Figure 4B:
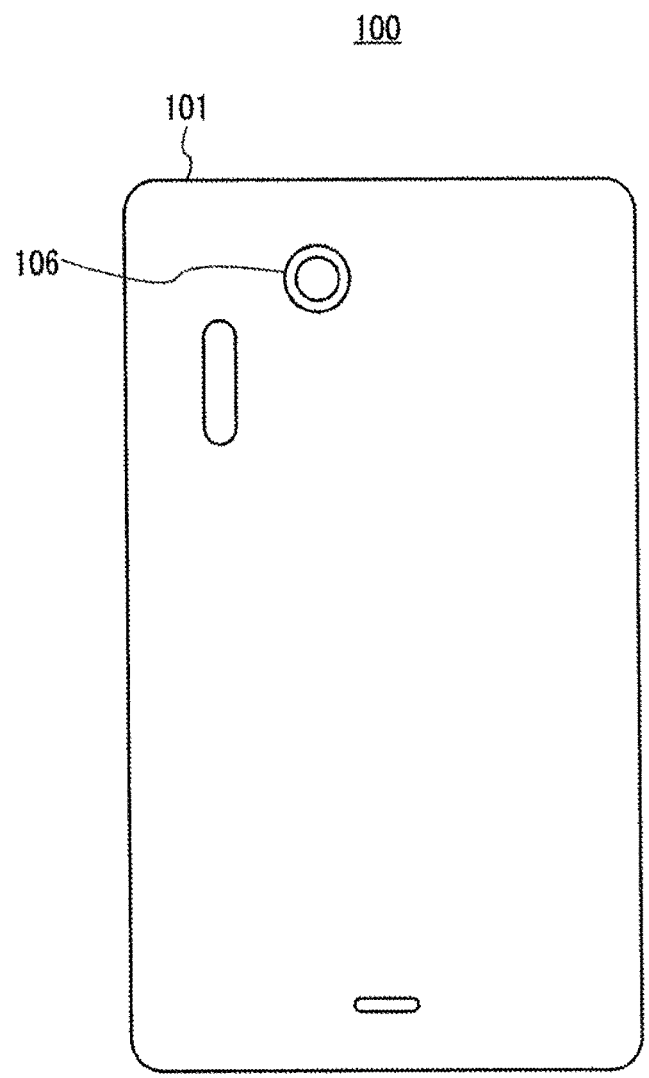
FIG. 4B is a view showing a configuration example of a wireless communication terminal according to an embodiment.
Figure 5:
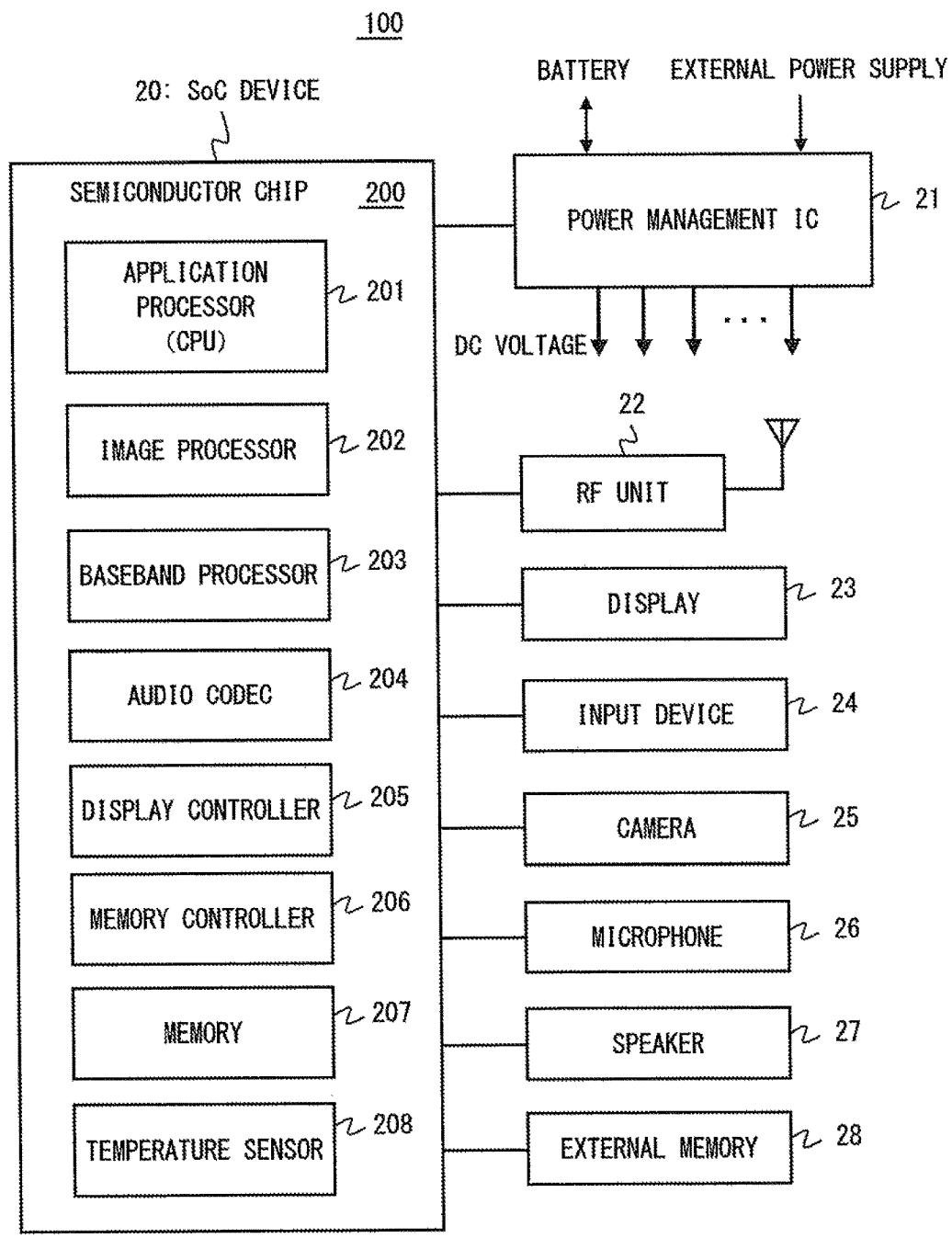
FIG. 5 is a view showing a configuration example of a wireless communication terminal according to an embodiment.

A wireless communication terminal 100 according to this embodiment includes a semiconductor device (e.g., a semiconductor integrated circuit device such as a SoC device) 20, and peripheral ICs (e.g., a power management IC and an RF (Radio Frequency)-IC) and peripheral devices (e.g., a display, a camera and an input device) that are connected to the SoC device 20. FIGS. 4A and 4B are outline views showing a configuration example of the wireless communication terminal 100. FIG. 5 is a functional block diagram showing a configuration example of the wireless communication terminal 100. Although the configuration examples shown in FIGS. 4A, 4B and 5 illustrate the case where the wireless communication terminal 100 is a smartphone, the wireless communication terminal 100 may be another wireless communication terminal such as a feature phone (e.g., a folding cellular phone), a portable game terminal, a tablet computer or a notebook PC (Personal Computer), for example. Hereinafter, the configuration and functions of the wireless communication terminal 100 are described with reference to FIGS. 4A, 4B and 5.

FIG. 4A shows one principal surface (front side) of an enclosure 101 of the wireless communication terminal 100. On the front side of the enclosure 101, a display 102, a touch panel 103, several operation buttons 104 and a camera 105 are placed. On the other hand, FIG. 4B shows the other principal surface (back side) of the enclosure 101. On the back side of the enclosure 101, a camera 106 is placed.

The display 102 is, for example, a LCD (Liquid Crystal Display) or OLED (Organic Light-Emitting Diode) display, and its display surface is placed on the front side of the enclosure 101. The touch panel 103 is placed to cover the display surface of the display 102 or placed on the reverse side of the display 102 to detect a position of contact with the display surface by a user. Specifically, touching the display surface of the display 102 with a finger or a pen applied to the display 102 (which is typically called a stylus), a user intuitively operates the wireless communication terminal 100. The operation buttons 104 are also used for operation of the wireless communication terminal 100. Some wireless communication terminals do not have such operation buttons.

The camera 106 is a main camera that is placed so that its lens unit is on the back side of the enclosure 101. On the other hand, the camera 105 is a sub-camera that is placed so that its lens unit is on the front side of the enclosure 101. Some wireless communication terminals do not have such a sub-camera.

<Description of SoC Device (Semiconductor Device)>

The internal configuration of the wireless communication terminal 100 is described hereinafter with reference to FIG. 5. The configuration example of FIG. 5 shows the SoC device 20 and peripheral ICs and peripheral devices connected to the SoC device 20. A SoC device generally means an IC device where many circuits required for an electronic system (e.g., a wireless communication terminal, a digital camera, a digital television, or an audio player) are integrated into one semiconductor chip. A SoC device is called a system LSI in some cases. The SoC device 20 shown in FIG. 5 is a SoC device installed in a wireless communication terminal, and it includes a semiconductor chip 200 in which a CPU (Central Processing Unit) and many other circuits (which are called circuit modules, functional blocks, macros or IP (intellectual Property) cores) are integrated. In the example of FIG. 5, an application processor (or CPU) 201, an image processor 202, a baseband processor 203, an audio CODEC 204, a display controller 205, a memory controller 206, a memory 207 and a temperature sensor 208 are integrated into the semiconductor chip 200. Note that the configuration example of FIG. 5 is merely one example. In other words, the wireless communication terminal 100 may include functional blocks, ICs or devices that are not shown in FIG. 5 or may not necessarily include some of the functional blocks, ICs and devices that are shown in FIG. 5.

The application processor 201 is also called a CPU, a MPU (Micro Processing Unit) or a microprocessor. Specifically, the application processor 201 implements functions of the wireless communication terminal 100 by executing a system software program (OS (Operating System) program) and application programs (e.g., a web browser, a mailer, a camera operation application, and a music playback application) read from the memory 207 or an external memory 28.

The image processor 202 performs image processing by hardware. The image processor 202 may perform either or both of decoding and encoding of video data (e.g., H.264, MPEG-4). Further, the image processor 202 may perform either or both of decoding and encoding of still image data (e.g., JPEG).

The baseband processor 203 performs digital baseband signal processing for wireless communication. The digital baseband signal processing includes, for example, (a) data compression/decompression, (b) data segmentation/concatenation, (c) transmission format (transmission frame) composition/decomposition, (d) transmission channel coding/decoding, (e) modulation (symbol mapping)/demodulation, (f) spreading/despreading, (g) OFDM symbol data (baseband OFDM signal) generation by IFFT (Inverse Fast Fourier Transform).

The audio CODEC 204 performs encoding of an analog audio signal received by a microphone 26 and decoding of audio data to be output from a speaker 27. The display controller 205 is a controller driver to drive a display 23. The display controller 205 includes drivers that supply a video signal and timing signals (e.g., a horizontal synchronizing signal and a vertical synchronizing signal) to the display 23 and a control circuit that controls transmission of the video signal and the timing signals. The memory controller 206 controls writing data to the external memory 29 and reading data from the external memory.

The memory 207 includes, for example, a ROM (Read Only Memory) that stores a boot code, a SRAM (Static Random Access Memory), a DRAM (Dynamic Random Access Memory) or a flash memory, or a combination of those.

<Overview of Temperature Sensor>

The temperature sensor 208 is a so-called on-chip temperature sensor and measures a chip temperature (which is also called a junction temperature or a channel temperature) of the semiconductor chip 200. The on-chip temperature sensor 208 according to this embodiment is configured to be able to intermittently measure the chip temperature. To be specific, the on-chip temperature sensor 208 sets the temperature measurement interval during the second operation state (e.g., a low power consumption state or a standby state) of the SoC device 20 to be longer than that during the first operation state (e.g., a normal operating state, a communicating state (connecting state), a video playing state, or a maximum operating state). In other words, the on-chip temperature sensor 208 sets the stop time of the temperature sensor 208 or part of it (e.g., an analog circuit) to be longer when the SoC device 20 is in the second operation state than when it is in the first operation state. On the other hand, temperature measurement by the temperature sensor 208 during the first operation state may be performed continuously or intermittently at a shorter time interval than during the second operation state. The SoC device 20 according to this embodiment can thereby perform intermittent temperature measurement during the second operation state (e.g., the standby state), and it is possible to perform control (i.e., transition to a still lower power consumption state) for preventing thermal runaway of the SoC device 20 based on a measurement result of the chip temperature. Further, the SoC device 20 according to this embodiment sets the temperature measurement interval during the second operation state to be longer than that during the first operation state, thereby suppressing an increase in power consumption during the second operation state. The SoC device 20 according to this embodiment is particularly effective for portable electronic apparatus such as a wireless communication terminal that is required to achieve low power consumption during the second operation state and is likely to be used in various ambient temperature environments. The details of the configuration and operation of the temperature sensor 208 are described later.

<Overview of Peripheral IC and Peripheral Device>

The peripheral ICs and the peripheral devices shown in FIG. 2 are described hereinbelow. In the configuration example of FIG. 2, the SoC device 20 is connected to a power management IC 21, an RF unit 22, a display 23, an input device 24, a camera 25, a microphone 26, a speaker 27 and an external memory 28. The display 23 corresponds to the display 102 shown in FIG. 1A. The camera 25 corresponds to the cameras 105 and 106 shown in FIGS. 1A and 1B.

The power management IC 21 generates internal power supply from a battery or external power supply. The internal power supply is supplied to each IC and each device in the wireless communication terminal 100. The power management IC 21 controls the voltage of the internal power supply in accordance with a block (an IC or a device) which receive the internal power supply. The power management IC 21 controls the voltage of the internal power supply based on an instruction from the SoC device 20 (e.g., the application processor 201). The internal power supply for blocks (ICs or devices) is stopped independently of each other by power management IC 21. The power management IC 21 may control battery charging.

The RF unit 22 performs analog RF signal processing. The analog RF signal processing includes frequency up-conversion, frequency down-conversion, amplification and the like. The RF unit 22 is coupled to the baseband processor 203. Specifically, the RF unit 22 receives modulation symbol data (or OFDM symbol data) from the baseband processor 203, generates a transmission RF signal and supplies the transmission RF signal to an antenna. The RF unit 22 also generates a baseband received signal based on a received RF signal received by the antenna and supplies it to the baseband processor 203.

<Detailed Description of Temperature Sensor>

A specific example of the configuration and operation of the on-chip temperature sensor 208 according to this embodiment is described in detail hereinbelow. The on-chip temperature sensor 208 is configured, in response to a change in the operation state of the SoC device 20, to switch from the continuous operation, in which it continuously measures the chip temperature, to the intermittent operation, in which it intermittently measures the chip temperature, or to change the time interval between intermittent measurements of the chip temperature. The temperature sensor 208 may measure the chip temperature periodically and intermittently when performing the intermittent operation.

Figure 6:
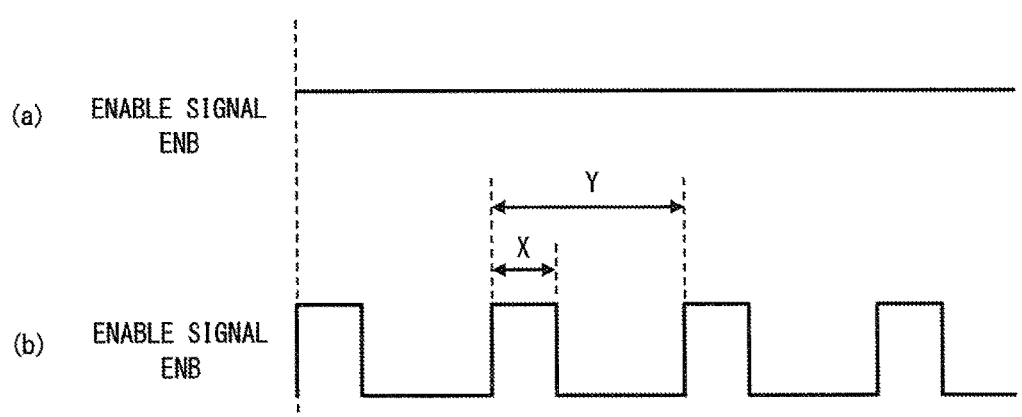
FIG. 6 is a waveform chart showing one example of an enable signal for controlling an operation of a temperature sensor or part (e.g., an analog circuit) of the temperature sensor.

In this specification, the operation that the temperature sensor 208 repeats start and stop of measurement of the chip temperature in a short cycle (e.g., in a cycle of several hundred seconds to several seconds) in an intermittent manner is referred to as "intermittent operation". When the temperature sensor 208 stops the measurement of the chip temperature, power supply to at least part of the temperature sensor 208 (e.g., an analog circuit including a temperature sensor element) is stopped. A difference between the continuous operation and the intermittent operation of the temperature sensor 208 can be represented as a difference in the waveform of an enable signal ENB for controlling the operation of the temperature sensor 208 or part of it (e.g., an analog circuit). FIG. 6(*a*) shows one example of the waveform of the enable signal ENB corresponding to the continuous operation, and FIG. 6(*b*) shows one example of the waveform of the enable signal ENB corresponding to the intermittent operation. When the enable signal ENB is High level, power is supplied to the temperature sensor 208 or part of it (e.g., an analog circuit), and the temperature sensor 208 measures the chip temperature. On the other hand, when the enable signal ENB is Low level, power supply to the temperature sensor 208 or part of it (e.g., the analog circuit) is stopped, and the temperature sensor 208 stops operating. In FIG. 6(*a*), the enable signal ENB is always High level, and therefore the temperature sensor 208 always receives power supply and continuously measures the chip temperature. On the other hand, in FIG. 6(*b*), the enable signal ENB has a pulse waveform and periodically repeats High level and Low level. A duty ratio (X/Y) of the enable signal in FIG. 6(*b*) is determined by a High period X and a signal cycle Y.

Note that the cycle of the intermittent operation of the temperature sensor 208 may be set arbitrarily in consideration of the temperature increasing speed (increasing rate) of the SoC device 20. In the example of FIG. 6(b), the cycle Y of the enable signal as a pulse signal is set based on the temperature increasing speed (increasing rate) of the SoC device 20. Further, the operating time of the temperature sensor 208 during the intermittent operation may be set arbitrarily in consideration of a response time of the temperature sensor 208 and a time required to stabilize the output of the temperature sensor 208 (stabilizing time). In the example of FIG. 6(b), the High level period of the enable signal or the duty ratio (X/Y) of the enable signal is set based on the response time and the stabilizing time of the temperature sensor 208.

<Description of Configuration and Operation of Temperature Sensor>

Figure 7:
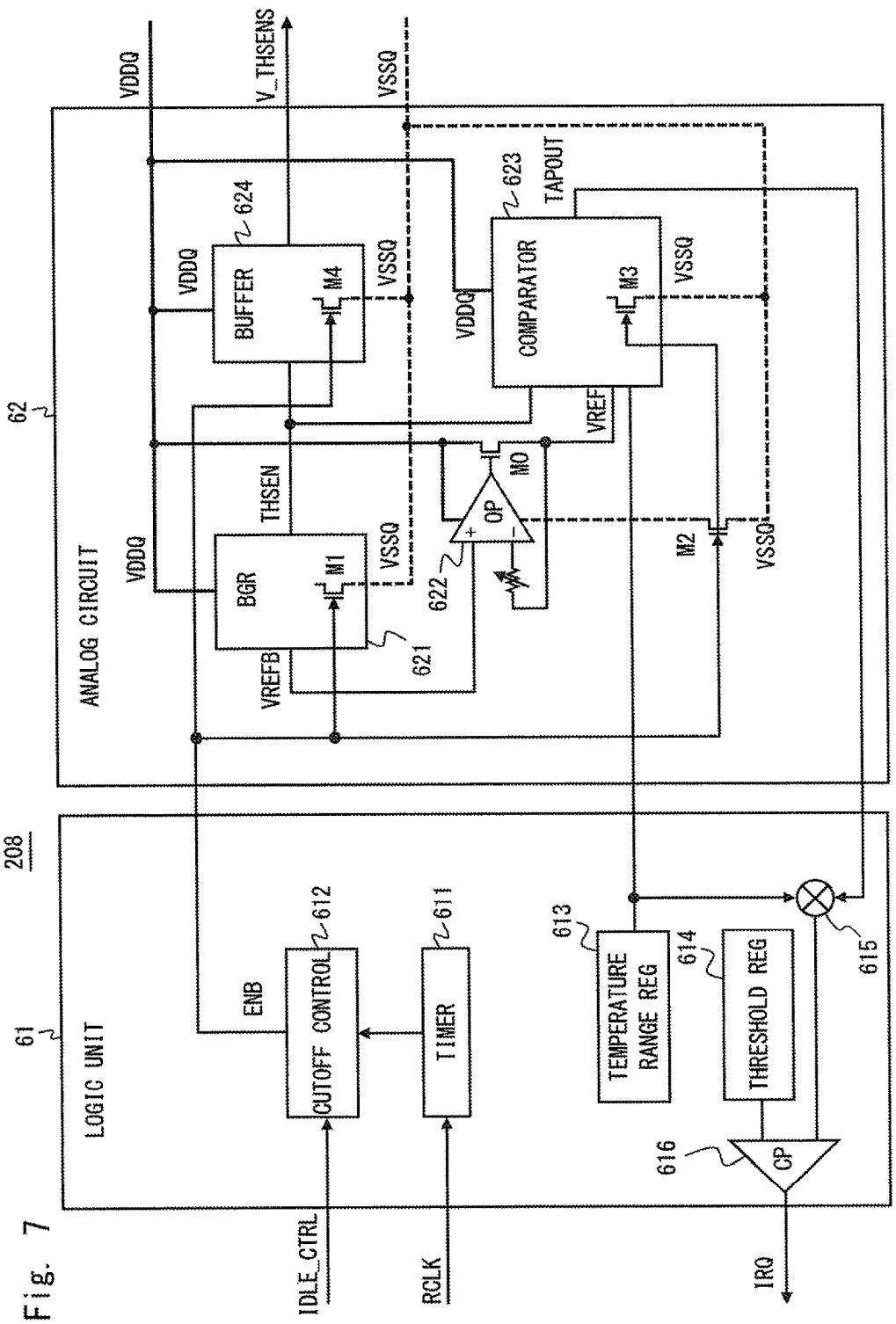
FIG. 7 is a view showing a configuration example of a temperature sensor included in a SoC device according to an embodiment.
Figure 8:
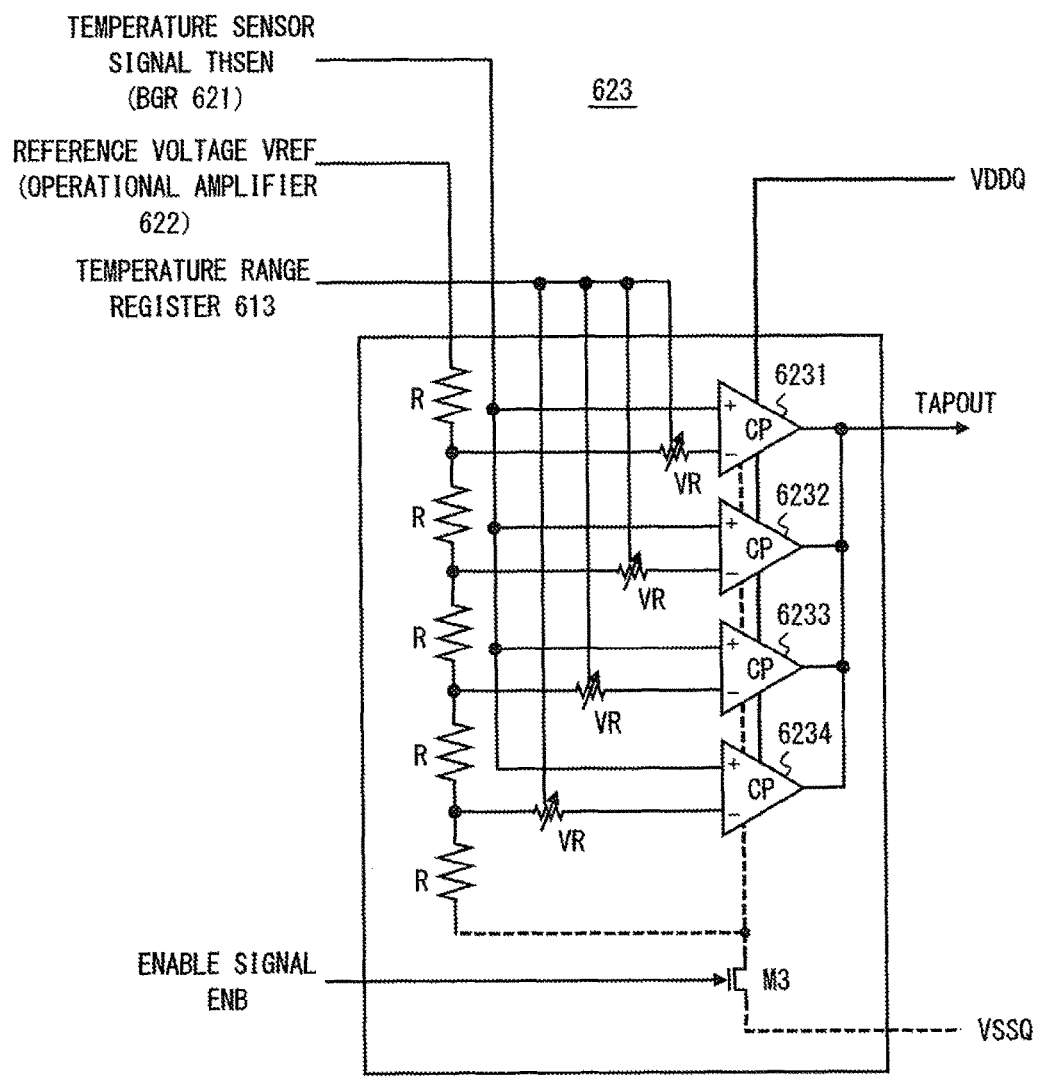
FIG. 8 is a view showing a configuration example of a comparator included in a temperature sensor according to an embodiment.

FIGS. 7 and 8 show a configuration example of the temperature sensor 208. FIG. 8 is a detailed block diagram of a comparator 623 shown in FIG. 7. In some implementations, the temperature sensor 208 includes a control logic unit 61 and an analog circuit 62. The analog circuit 62 is configured to generate a sensor signal THSEN based on the chip temperature. The control logic unit 61 is configured to generate a control signal (i.e., the enable signal) to be supplied to the analog circuit 62. In accordance with the control signal (the enable signal) from the control logic unit 61, the analog circuit 62 operates to switch from the continuous operation in which it continuously generates the sensor signal THSEN to the intermittent operation in which it intermittently generates the sensor signal THSEN, or to change the time interval between intermittent generations of the sensor signal.

The control logic unit 61 generates the control signal (the enable signal) for controlling reduction of power consumption in the analog circuit 62. In the example of FIG. 7, the control logic unit 61 generates the enable signal for controlling on and off of power supply switches M1 to M4 placed in the analog circuit 62. The enable signal is supplied to the power supply switches M1 to M4 and controls on and off of them. The enable signal may be a pulse signal that is supplied to control terminals (e.g., gates) of transistor switches (e.g., MOSFET switches or CMOS transmission gates) serving as the power supply switches M1 to M4, for example. In this configuration, the control logic unit 61 can control the intermittent operation of the analog circuit 62 of the temperature sensor 208 autonomously without depending on software control by the application processor (CPU) 201. Therefore, the temperature sensor 208 can autonomously perform the intermittent operation even when the application processor (CPU) 201 stops operating in the low power consumption state such as a standby state.

Further, in the configuration example of FIG. 7, the control logic unit 61 includes a timer 611 and cutoff control logic 612 for generating the enable signal. The timer 611 has a counter and counts up (or counts down) the timer in accordance with a low-frequency clock signal RCLK. The cutoff control logic 612 generates a pulse signal (i.e., the enable signal) with a desired duty ratio based on a count value of the timer 611. The duty ratio of the enable signal defines the time interval between intermittent sensor signal generations by the analog circuit 62. The duty ratio (X/Y) of the enable signal may be configurable from the outside of the temperature sensor 208. To be specific, a configuration register that stores a set value of the duty ratio may be included in the control logic unit 61. For example, the application processor 201 may write the set value of the duty ratio into the configuration register.

Figure 9A:
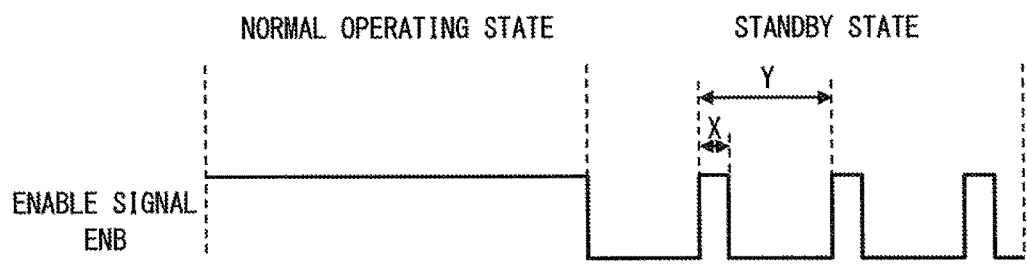
FIG. 9A is a waveform chart showing one example of an enable signal supplied to an analog module included in a temperature sensor according to an embodiment.
Figure 9B:
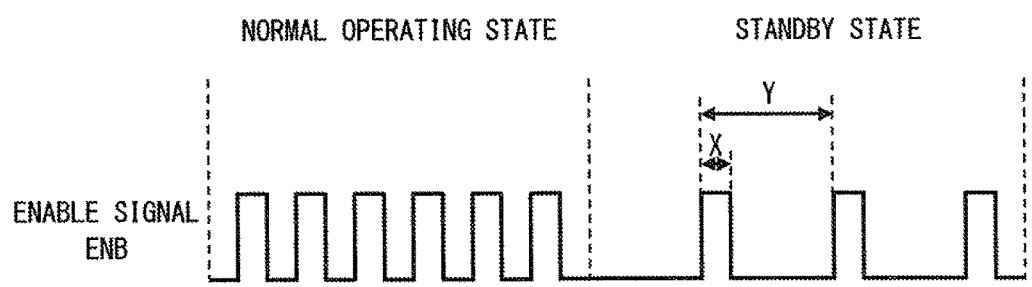
FIG. 9B is a waveform chart showing another example of an enable signal supplied to an analog module included in a temperature sensor according to an embodiment.

Further, the cutoff control logic 612 is configured, in accordance with an idle control signal (IDLE_CTRL), to switch from the continuous operation, in which it continuously generates the sensor signal, to the intermittent operation, in which it intermittently generates the sensor signal, or to change the time interval between intermittent generations of the sensor signal. The idle control signal indicates switching of the operation mode of the temperature sensor 208. The idle control signal may be supplied from the application processor 201 to the temperature sensor 208, and its value may be changed according to switching of the operation state of the SoC device 20 (e.g., switching between the normal operating state and the standby state). The idle control signal may be a 1-bit signal. The cutoff control logic 612 changes the enable signal according to a value of the idle control signal. For example, as shown in FIG. 9A, the cutoff control logic 612 may change the waveform of the enable signal between the waveform of constant High level (or constant Low level) indicating the continuous operation of the analog circuit 62 and the pulse waveform indicating the intermittent operation of the analog circuit 62. Alternatively, as shown in FIG. 9B, the cutoff control logic 612 may change the duty ratio of the enable signal as a pulse signal in order to change the time interval of the intermittent operation of the analog circuit 62.

Further, the control logic unit 61 shown in the configuration example of FIG. 7 operates to output an interrupt request signal IRQ when the chip temperature measured by the analog circuit 62 exceeds a specified threshold. To implement this operation, the control logic unit 61 includes a temperature range register 613, a threshold register 614, a multiplier 615 and a comparator 616. The temperature range register 613 stores a set value of a temperature range that is applied to the temperature sensor 208. The threshold register 614 stores a threshold of the chip temperature. The multiplier 615 multiplies an output signal TAPOUT of a comparator 623 placed in the analog circuit 62 and a value of the temperature range register 613. Note that the signal TAPOUT is generated using the sensor signal based on the chip temperature. The comparator 616 compares the output signal of the multiplier 615 with the threshold value stored in the threshold register 614 and, when the output signal of the multiplier 615 exceeds the threshold, outputs the interrupt request signal IRQ.

The configuration of the analog circuit 62 shown in FIGS. 7 and 8 is described hereinafter. The analog circuit 62 shown in FIG. 7 includes a BGR (Band Gap Reference) 621, an operational amplifier 622, a comparator 623 and an output buffer 624. Those circuits operate between a high-potential power supply VDDQ and a low-potential power supply VSSQ. The BGR 621 includes a temperature sensor element (to be specific, a thermal diode) that generates the sensor signal based on the chip temperature. Specifically, the BGR 621 generates a reference voltage VREFB that does not depend on the chip temperature and a sensor signal THSEN that increases or decreases according to the chip temperature.

The operational amplifier 622 generates a reference voltage VREF based on the reference voltage VREFB generated by the BGR 621. Specifically, the positive input terminal of the operational amplifier 622 receives the reference voltage VREFB generated by the BGR 621. On the other hand, the negative input terminal of the operational amplifier 622 is connected to the output of the output transistor M0 through a variable resistor. The output transistor M0 has the input terminal that is connected to the high-potential power supply VDDQ, the output terminal that is connected to the low-potential power supply VSSQ through a resistor ladder (a plurality of resistors R shown in FIG. 8), and the control terminal that is driven by the operational amplifier 622. Accordingly, the potential VREF at the output terminal of the transistor M0 is a constant potential that is determined by the reference voltage VREFB generated by the BGR 621 and a resistance value of the variable resistor placed on the negative feedback path.

The comparator 623 is configured as shown in FIG. 8. The comparator 623 includes comparator elements 6231 to 6234. The comparator elements 6231 to 6234 compare the temperature sensor signal THSEN with different voltages. Specifically, the positive input terminal of each comparator element receives the temperature sensor signal THSEN generated by the BGR 621. Further, the negative input terminal of each comparator element receives one of a plurality of voltages obtained by dividing the reference voltage VREF by the resistor ladder (a plurality of resistors R). A variable resistor VR is placed between the negative input terminal of each comparator element and the resistor ladder. The resistance of the variable resistor VR is adjusted according to the value of the temperature range register 613. An output signal TAPOUT of the comparator elements 6231 to 6234 is supplied to the control logic unit 61 for comparison with a threshold.

The output buffer 624 is a buffer for outputting the temperature sensor signal THSEN to the outside of the SoC device 20. The analog output (V_THSENS) of the output buffer 624 is connected to the output terminal (e.g., a pad 214 in FIG. 12, which is described later) of the SoC device 20. Note that, in the case where there is no need to output the sensor signal to the outside of the SoC device 20, the output buffer 624 may be omitted.

Further, the analog circuit 62 has a structure for reducing power consumption of analog circuit elements (e.g., the BGR 621, the comparator 623 and the output buffer 624) that intermittently stop operating. The analog circuit 62 may perform so-called power gating. In the example of FIGS. 7 and 8, the analog circuit elements, which are the BGR 621, the operational amplifier 622, the comparator 623 and the output buffer 624, have the power supply switches M1 to M4 for cutting off those current paths. The power supply switches M1 to M4 operate to cut off the current path intermittently in response to the enable signal supplied from the control logic unit 61. The power supply switches M1 to M4 may be, for example, MOSFET switches or CMOS transmission gates. Although FIGS. 7 and 8 shows the example in which the power supply switches M1 to M4 are placed on the VSSQ side (so-called footer switches), those power supply switches may be placed on the VDDQ side (so-called header switches). In these configurations, it is possible to cut off the current paths in the analog circuit 62 of the temperature sensor 208 when there is no need to generate the sensor signal THSEN. It is thereby possible to sufficiently suppress the leakage current of the analog circuit 62 and reduce power consumption of the temperature sensor 208 that performs the intermittent operation.

The configuration of the temperature sensor 208 shown in FIGS. 7 and 8 is merely one example. Specifically, although FIG. 7 shows the enable signal generation structure including the timer 611 and the cutoff control logic 612, the control logic unit 61 may have another structure for generating the enable signal (pulse signal). For example, the control logic unit 61 may have a pulse signal generation circuit that generates a pulse signal by frequency division and decimation on a clock signal CLK.

Further, although FIGS. 7 and 8 show the example in which a diode element (e.g., a diode-connected transistor) included in the BGR 621 for generating the temperature-independent reference voltage is used also as the temperature sensor element for measuring the chip temperature, the temperature sensor element (e.g., a thermal diode) may be placed separately from the BGR 621. Further, the output buffer 624 may be omitted when there is no need to output the sensor signal to the outside of the SoC device 20.

<Description of Layout of Temperature Sensor>

Figure 10A:
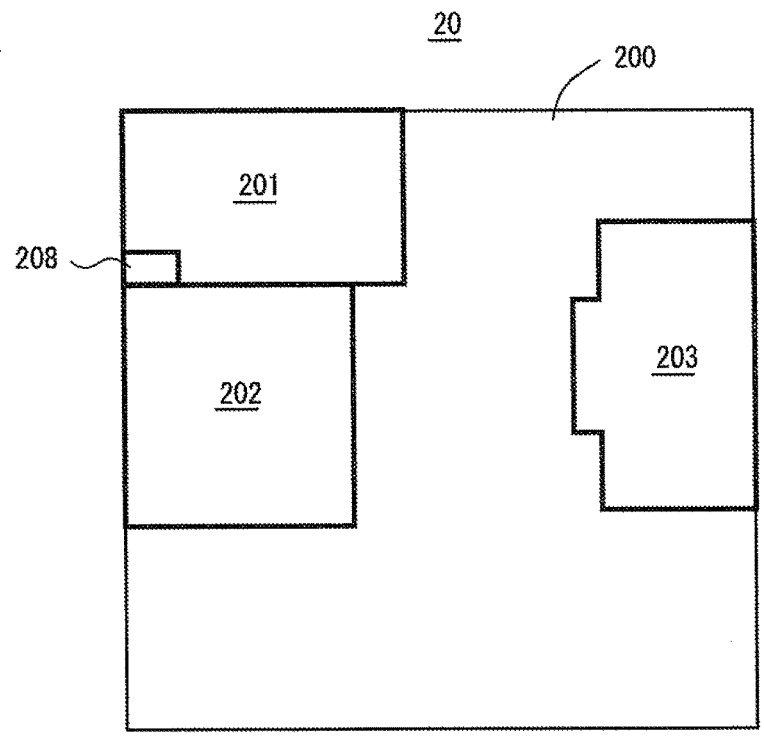
FIG. 10A is a view showing one example of a floor plan of a SoC device according to an embodiment.
Figure 10B:
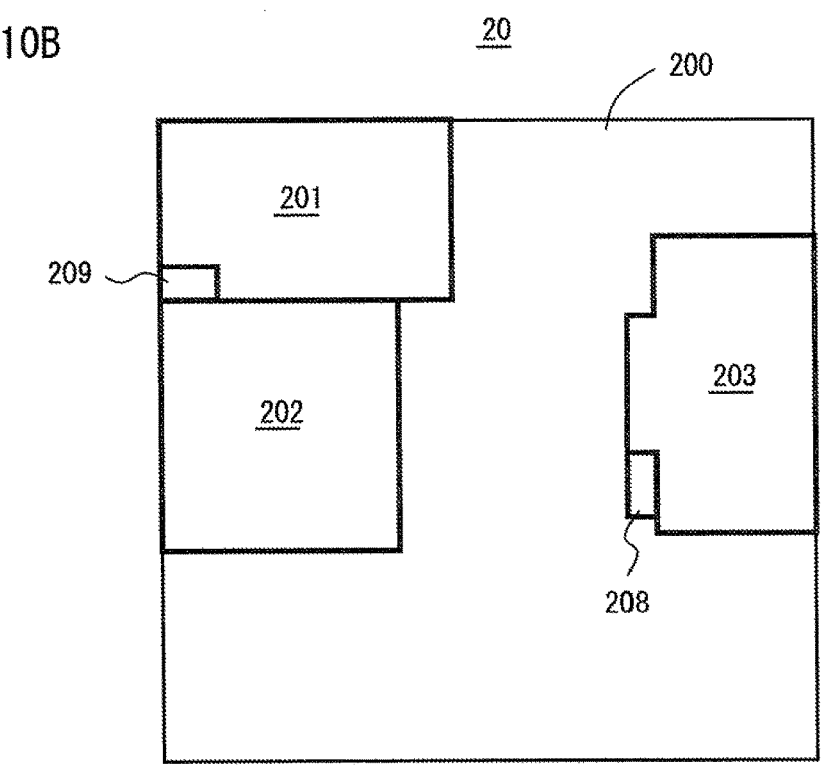
FIG. 10B is a view showing another example of a floor plan of a SoC device according to an embodiment.

A specific example of the layout of the on-chip temperature sensor 208 is described hereinbelow. The on-ship temperature sensor 208 is placed preferably near or more preferably adjacent to the main heat source in the SoC device 20. FIGS. 10A and 10B show examples of the floor plan of the SoC device 20. In the floor plan of FIG. 10A, the temperature sensor 208 is placed adjacent to both of the application processor 201 and the image processor 202. To be specific, the temperature sensor 208 is placed between the application processor 201 and the image processor 202. The application processor 201 and the image processor 202 operate at a high clock rate in the normal operating state (i.e., the first operation state), and thus the operating currents of them in the normal operating state are larger than the operating currents of the other functional blocks. Further, the ratio (area ratio) of areas of the application processor 201 and the image processor 202 to the surface area of the semiconductor chip 200 is larger than those of the other functional blocks, and thus the leakage currents of them are also larger than those of the other functional blocks. Specifically, the heat generation rate of the application processor 201 and the image processor 202 in the normal operating state is larger than that of the other functional blocks in the SoC device 20. Accordingly, the position between the application processor 201 and the image processor 202, which are the main heat source of the SoC device 20 in the normal operating state, is expected to be the highest temperature on the semiconductor chip 200. The temperature sensor 208 placed as shown in FIG. 10A can therefore measure the chip temperature at the position between the application processor 201 and the image processor 202 which is expected to be the highest temperature in the normal operating state.

Note that the temperature sensor 208 may be placed near or preferably adjacent to either the application processor 201 or the image processor 202. Further or alternatively, the temperature sensor 208 may be placed near or preferably adjacent to the functional block (e.g., the application processor 201 or the image processor 202) having the highest power consumption during the normal operating state (i.e., the first operation state). The temperature sensor 208 can thereby measure the chip temperature around the functional block which is expected to be the highest temperature in the normal operating state.

Further or alternatively, the temperature sensor 208 may be placed near or preferably adjacent to a functional block having a large area ratio (e.g., the area ratio of 5 percent or more or preferably 8 percent or more) to the surface area of the semiconductor chip 200. It is considered that leakage current increases as an area ratio of a functional block increases. Thus, a functional block having a large area ratio is likely to be a main heat source not only in the normal operating state (i.e., the first operation state) but also in the standby state (i.e., the second operation state). The temperature sensor 208 placed adjacent to a functional block having a large area ratio can therefore measure the chip temperature around the functional block which is the main heat source in the normal operating state and the standby state.

In the floor plan of FIG. 10B, the temperature sensor 208 that performs the intermittent operation during the standby state (i.e., the second operation state) is placed adjacent to the baseband processor 203. The baseband processor 203 performs the discontinuous reception operation for receiving the paging signal during the standby state as described above. On the other hand, in some implementations, at least one of the application processor 201 (or part of it) and the image processor 202 suppresses its operation in order to reduce power consumption during the standby state. For example, during the standby state, power supply to the application processor 201 (or part of it) and the image processor 202 is stopped or reduced. In such implementations, the main heat source in the standby state (i.e., the second operation state) is considered to be the baseband processor 203. Specifically, in the example of FIG. 10B, the temperature sensor 208 that performs the intermittent operation during the standby state is placed adjacent to the functional block (e.g., the baseband processor 203) which is the main heat source in the standby state, thereby measuring the temperature around the functional block which is the main heat source in the standby state.

Further, in the example of FIG. 10B, a temperature sensor 209 is placed between the application processor 201 and the image processor 202. In this manner, two or more on-chip temperature sensors may be placed on the semiconductor chip 200. The temperature sensor 209 may continuously measure the chip temperature around the application processor 201 and the image processor 202 in the normal operating state. On the other hand, in the standby state (i.e., the second operation state), the temperature sensor 209 may perform the intermittent operation or stop operating. In particular, in the case where the application processor 201 and the image processor 202 are not the main heat source in the standby state, the temperature sensor 209 preferably stops operating in the standby state. Specifically, in the case where the main heat source in the SoC device 20 is different between the normal operating state (i.e., the first operation state) and the standby state (i.e., the second operation state), the temperature sensor 208 that is placed near the main heat source in the standby state may operate intermittently in the standby state, and the other temperature sensor 209 may stop operating in the standby state. It is thereby possible to reduce power consumption in the standby state.

<Description of Power Supply Area of SoC Device (Semiconductor Device)>

Figure 11:
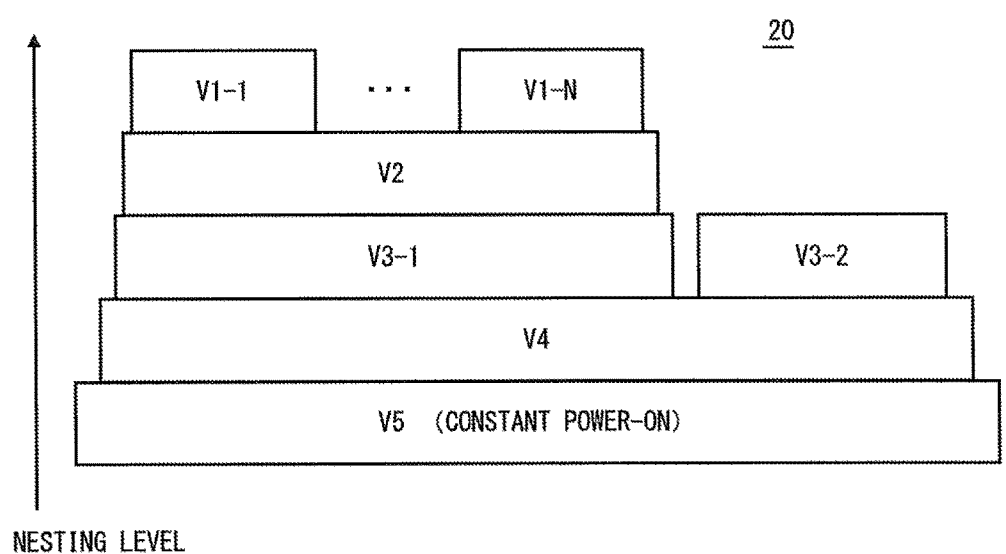
FIG. 11 is a view showing layers of power supply areas in a SoC device according to an embodiment.

The layers of the power supply areas in the SoC device 20 is described hereinbelow. With a view to reduce power consumption, a technique that divides a semiconductor chip into power supply areas (which are also called voltage islands) so as to be able to stop power supply for each power supply area is known. FIG. 11 shows one example of a hierarchical structure of power supply areas in the SoC device 20 to which this technique is applied. A plurality of power supply areas have a relationship of dependency or nesting according to the connections or functions of the circuit blocks included therein. In the example of FIG. 11, the highest power supply layer V1 corresponds to the power supply area that is the most likely to be powered off, and the lowest power supply layer V5 corresponds to the power supply area that is the least likely to be powered off (e.g., constantly powered on). For example, the power management IC 21 supplies the internal power supply to the respective power supply areas and power supply layers. The power supply to an upper layer (e.g., V1) may be generated from the power supply to a lower layer (e.g., V2, V3 or V4). Cutoff of the power supply to each power supply area may be performed by the power management IC 21. Alternatively, cutoff of the power supply to each power supply area may be performed by controlling a power supply switch placed in each power supply area for power gating. The system control logic (system controller) in the SoC device 20 may control those power supply switches. Cutoff of the power supply to each power supply area needs to be performed in accordance with a relationship of nesting. For example, when at least one of N-number of the highest power supply layers V1-1 to V1-N is operating, power should be supplied also to the power supply areas corresponding to the second power supply layer V2 and the third power supply layer V3-1 having a relationship of nesting with those highest power supply layers. On the other hand, because the third power supply layer V3-2 does not have a relationship of nesting with the highest power supply layers V1-1 to V1-N, power supply to the third power supply layer V3-2 may be shut off regardless of the operation of those highest power supply layers.

Figure 12:
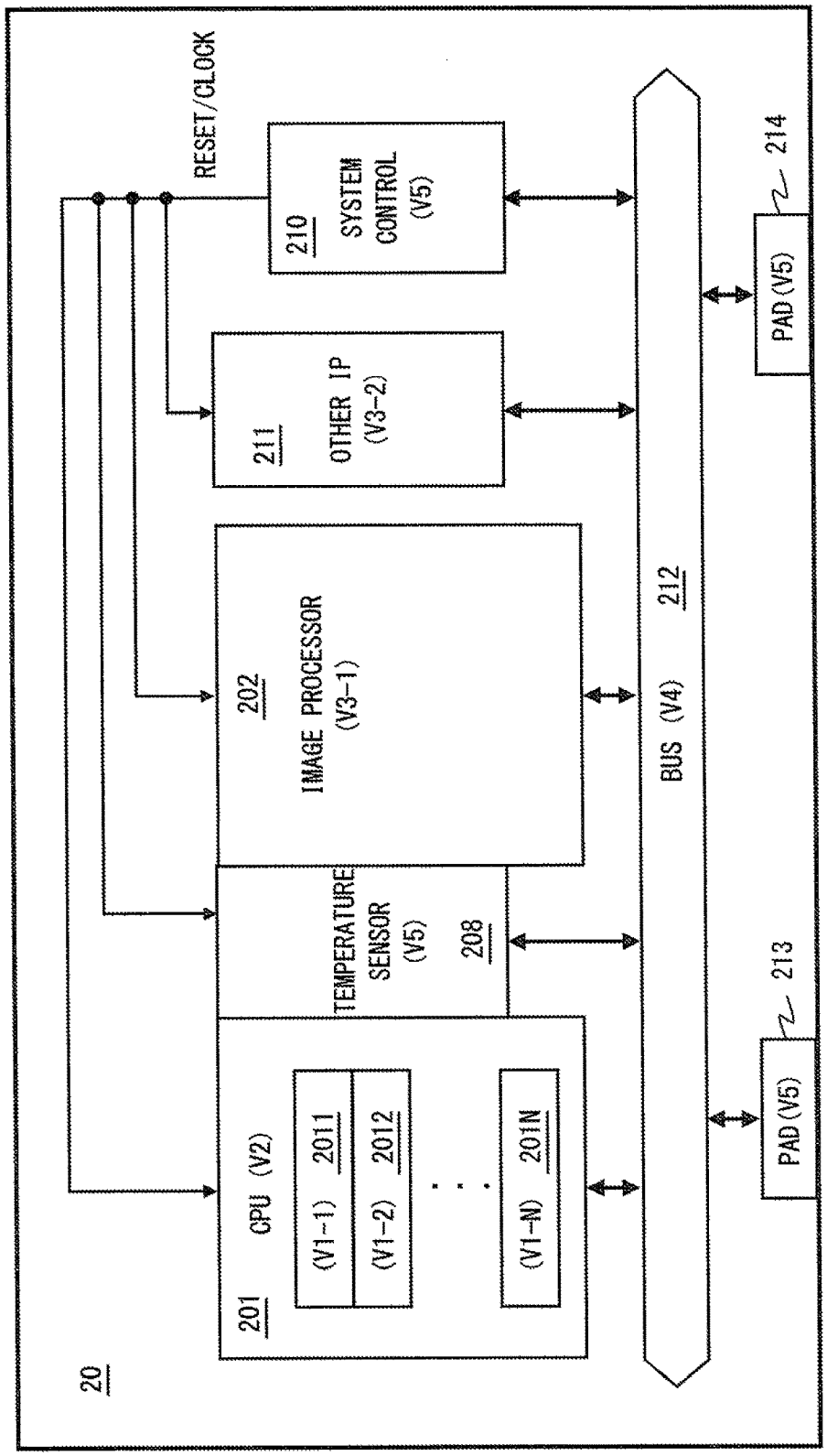
FIG. 12 is a view showing correspondence between functional blocks and layers of power supply areas in a SoC device according to an embodiment.

FIG. 12 shows one example of correspondence between functional blocks and layers of power supply areas in the SoC device 20. In the example of FIG. 12, the temperature sensor 208, a system control logic (system controller) 210 and pads (terminals) 213 and 214 are located on the lowest-level power supply layer V5. The system control logic 210 performs clock control and reset control of each functional block. Specifically, the system control logic 210 changes a clock frequency, stops supply of a clock signal and sends a reset signal. The system control logic 210 may control power supply switches placed in power supply areas for power gating. The pads 213 and 214 are used to transmit and receive signals to and from the peripheral devices (e.g., the display 23 and the external memory 28). A bus 212 that connects the functional blocks is located on the second lowest power supply layer V4. The image processor 202 and another IP core 211 are located on the third lowest power supply layers V3-1 and V3-2, respectively. The application processor (CPU) 201 is located on the power supply layers V1 and V2. Thus, the CPU 201 is divided into a plurality of power supply areas having a nesting relationship. The N-number of power supply areas 2011, 2012, . . . , 201N in the CPU 201 correspond to the highest power supply layers V1-1 to V1-N, respectively.

In order to intermittently measure the chip temperature in the case where the temperature sensor 208 is placed in the power supply area (V5) that is always powered on as shown in FIG. 12, the power supply switches (e.g., the switches M1 to M4) may be placed on the current paths in the analog circuit 62 of the temperature sensor 208 as shown in FIGS. 7 and 8.

<Description of Overall Operation of SoC Device Including Temperature Sensor>

One example of thermal runaway prevention control during the second operation state (e.g., the standby state) of the SoC device 20 is described hereinbelow. As described earlier, during the second operation state of the SoC device 20, the temperature sensor 208 intermittently measures the chip temperature of the semiconductor chip 200. Then, when the chip temperature exceeding a specified threshold temperature is measured by the temperature sensor 208, the SoC device 20 transitions from the second operation state (e.g., the standby state) to a third operation state (e.g., the minimum operating state) having still lower power consumption. The threshold temperature may be set approximately to a temperature at which thermal runaway can occur during the second operation state (e.g., the standby state) based on results of thermal analysis simulations on the SoC device 20. In the third operation state (e.g., the minimum operating state), the clock frequency of the functional blocks that operate during the second operation state may be lowered, and thereby the operating current can be reduced compared with the second operation state. Further or alternatively, in the third operation state (e.g., the minimum operating state), power supply to the functional blocks (or the power supply areas) that operate during the second operation state may be stopped, and thereby the leakage current can also be reduced compared with the second operation state.

The transition of the SoC device 20 to the third operation state may be controlled by the application processor 201 (and system software (OS)) that has received an interrupt request from the temperature sensor 208. Alternatively, the transition of the SoC device 20 to the third operation state may be controlled by an external IC (e.g., the power management IC 21) that receives analog output V_THSNS of the temperature sensor 208. The latter control is effective in the case where power supply to the major part of the SoC device 20 including the application processor 201 is stopped.

Figure 13:
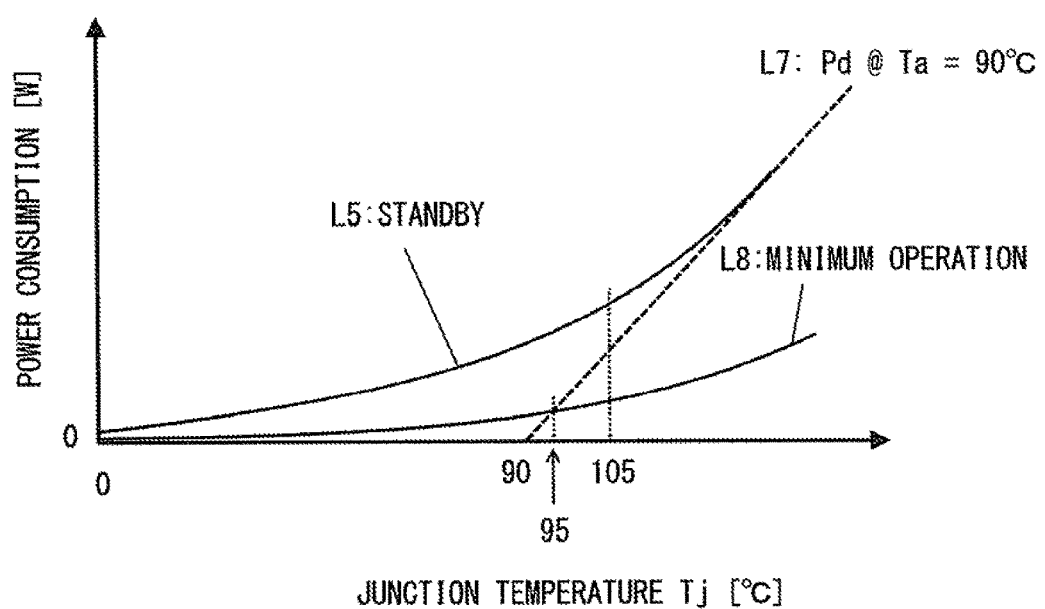
FIG. 13 is a graph illustrating power consumption in two operation states (specifically, a standby state and a minimum operating state) of a SoC device according to an embodiment.

FIG. 13 is a graph showing one example of a relationship between power consumption and a junction temperature (channel temperature) Tj during the second and third operation states of the SoC device 20. The solid line L5 in FIG. 13 indicates power consumption of the SoC device 20 in the standby state (the second operation state), and the solid line L8 in FIG. 13 indicates power consumption of the SoC device 20 in the minimum operating state (the third operation state). Note that the solid line L5 in FIG. 13 is the same as the solid line L5 in FIG. 3. Thus, in the example of FIG. 13, the SoC device 20 can go into thermal runaway even in the standby state when the ambient temperature Ta reaches about 90° C. Accordingly, the threshold temperature for the chip temperature to be measured by the temperature sensor 208 may be set to 90° C. or set to 105° C., for example. When the chip temperature exceeding 105° C. is detected, the SoC device 20 transitions to the minimum operating state (L8 in FIG. 13). Consequently, even in the environment where the ambient temperature Ta is 90° C., the chip temperature (junction temperature) of the semiconductor chip 200 converges to the intersection with the straight line L7 (i.e., 95° C.) and therefore thermal runaway does not occur.

Figure 14:
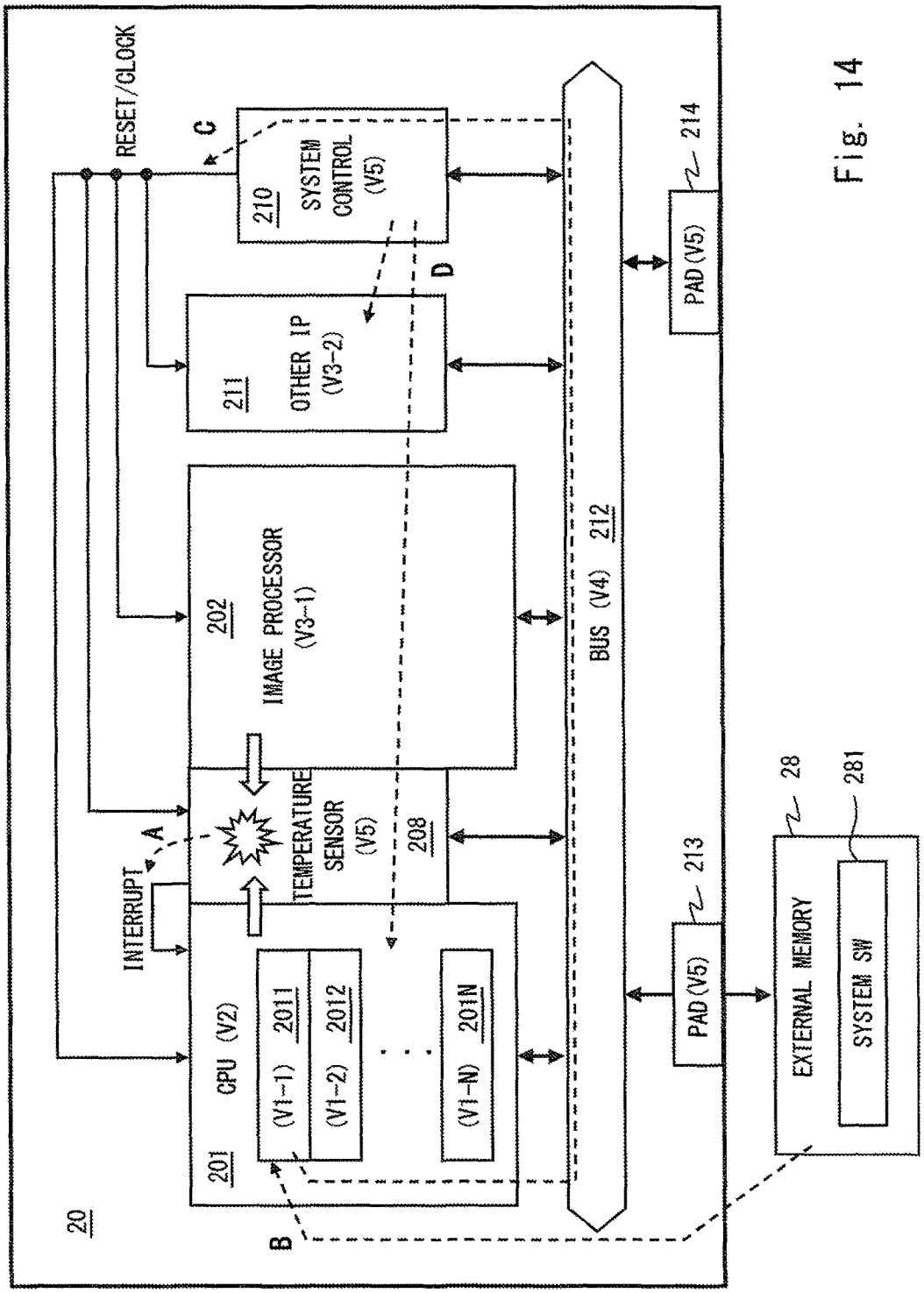
FIG. 14 is a view illustrating a transition of operation state for lower power consumption of a SoC device according to an embodiment.

FIG. 14 is a conceptual diagram showing one example of the operation of the SoC device 20 when transitioning from the second operation state to the third operation state. First, as indicated by the dashed arrow A in FIG. 14, the temperature sensor 208 during the intermittent operation detects the chip temperature exceeding a threshold temperature and sends an interrupt request to the application processor (CPU) 201. The application processor (CPU) 201 receives the interrupt request from the temperature sensor 208 and then reads the system software 281 stored in the external memory 28 (or the internal memory 207 of the SoC device 20) and starts interrupt processing (the dashed arrow B in FIG. 14). By execution of the interrupt processing, as indicated by the dashed arrow C in FIG. 14, the system control logic 210 reduces the frequency of the operating clock that is supplied to the functional block specified by the application processor (CPU) 201. Further, as indicated by the dashed arrow D in FIG. 14, the system control logic 210 may stop power supply to the functional block (power supply area) specified by the application processor (CPU) 201. For example, in the application processor (CPU) 201 that consumes higher power than the other functional blocks, power supply to the power supply areas 201₂ to 201N is stopped, excluding the power supply area 201₁. For example, the SoC device 20 may set two threshold temperatures TH1 and TH2 (where TH1<TH2), reduce the operating clock frequency (the dashed arrow C in FIG. 14) when the chip temperature exceeds TH1 and further shut off the power supply (the dashed arrow D in FIG. 14) when the chip temperature exceeds TH2.

Figure 15A:
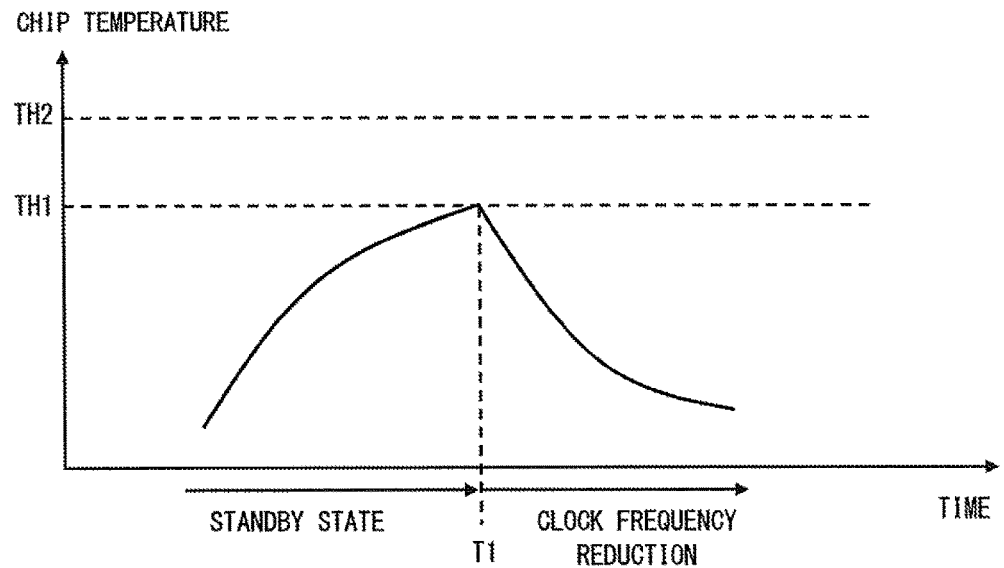
FIG. 15A is a graph showing a relationship between a transition of operation state and a chip temperature of a SoC device according to an embodiment.
Figure 15B:
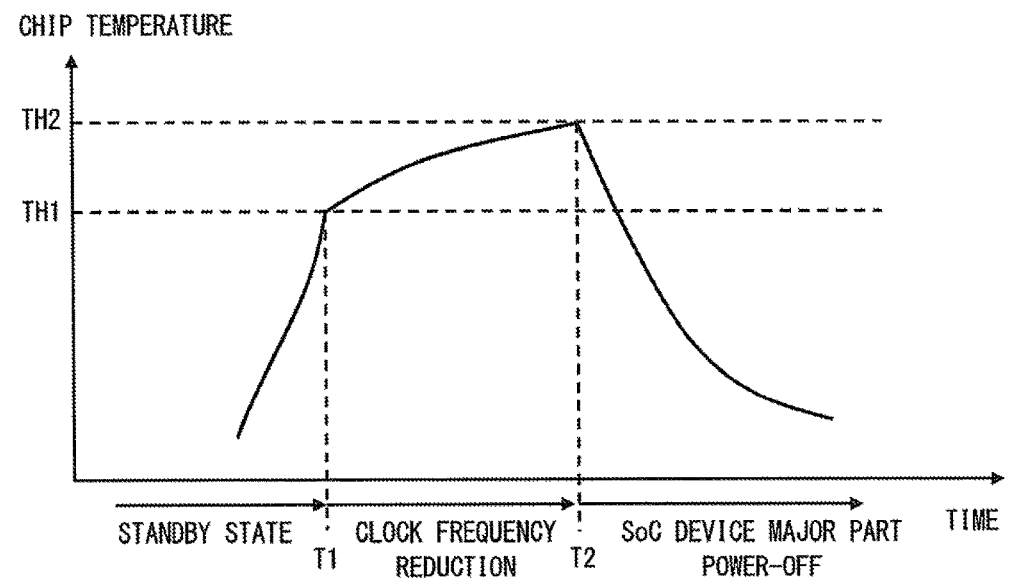
FIG. 15B is a graph showing a relationship between a transition of operation state and a chip temperature of a SoC device according to an embodiment.

FIGS. 15A and 15B are graphs showing a conceptual relationship between the status transition of the SoC device 20 from the second operation state to the third operation state and the chip temperature. As shown in FIG. 15A, when the chip temperature detected by the temperature sensor 208 reaches the first threshold temperature TH1 (time T1 in the figure), the SoC device 20 may lower the operating clock frequency. The operating current of the SoC device 20 is thereby reduced, and the heat generation rate of the SoC device 20 is also reduced, and the chip temperature of the semiconductor chip 200 is expected to decrease accordingly. However, in some cases, the heat generation rate of the SoC device 20 is not sufficiently reduced only by lowering the operating clock frequency and the chip temperature continues to increase as shown in FIG. 15B. In such a case, when the chip temperature detected by the temperature sensor 208 reaches the second threshold temperature TH2 (time T2 in FIG. 15B), power supply to the major part of the SoC device 20 is stopped. The operating current and the heat generation rate of the SoC device 20 are thereby further reduced, and the chip temperature of the semiconductor chip 200 is expected to decrease accordingly.

As described above, in the SoC device 20 according to this embodiment, the temperature sensor 208 performs the intermittent operation during the second operation state. Therefore, the SoC device 20 according to this embodiment can suppress an increase in power consumption while measuring the temperature by the on-chip temperature sensor during the second operation state. For example, power consumption of the temperature sensor 208 under the condition where VDDQ is 1.05V and the frequency of the clock RCLK is 32 kHz is as follows:

(1) Continuous operation (duty ratio=1): power consumption P0 of the temperature sensor 208 is about 1 μW;
(2) Intermittent operation 1 (duty ratio=500 ms/1 s=0.500): power consumption P1 of the temperature sensor 208 is about 500 μW;
(3) Intermittent operation 2 (duty ratio=250 ms/1 s=0.250): power consumption P2 of the temperature sensor 208 is about 250 μW;
(4) Intermittent operation 3 (duty ratio=125 ms/1 s=0.125): power consumption P3 of the temperature sensor 208 is about 125 μW; and
(5) Intermittent operation 4 (duty ratio=1 ms/1 s=0.001): power consumption P4 of the temperature sensor 208 is about 1 μW.

Second Embodiment

In this embodiment, a modified example of the on-chip temperature sensor 208 that is described in the first embodiment is described. An on-chip temperature sensor 308 according to this embodiment includes a control logic unit and an analog circuit, just like the temperature sensor 208. The analog circuit includes analog circuit elements including a temperature sensor element (e.g., a thermal diode, BGR) that generates a sensor signal and an output buffer. Further, the analog circuit has a structure (e.g., power supply switches) for reducing power consumption of those analog circuit elements similar to the first embodiment. Furthermore, the temperature sensor 308 according to this embodiment is configured to be able to stop the operation of the output buffer independently of the temperature sensor element. For example, the control logic unit controls on and off of a power supply switch that is placed on the current path of the output buffer, independently of a power supply switch that is placed on the current path of the temperature sensor element. As described earlier, when there is no need to output the sensor signal of the temperature sensor 308 to the outside of the SoC device 20, the output buffer included in the temperature sensor 308 is a redundant element. In this embodiment, power supply to the output buffer can be stopped independently of the other analog circuit elements (e.g., the temperature sensor element), and thus it is possible to always stop power supply to the output buffer even while the other analog circuit elements is performing the intermittent operation for measuring the chip temperature. The temperature sensor 308 according to this embodiment can thereby reduce power consumption when performing the intermittent operation compared with the temperature sensor 208 according to the first embodiment.

Figure 16:
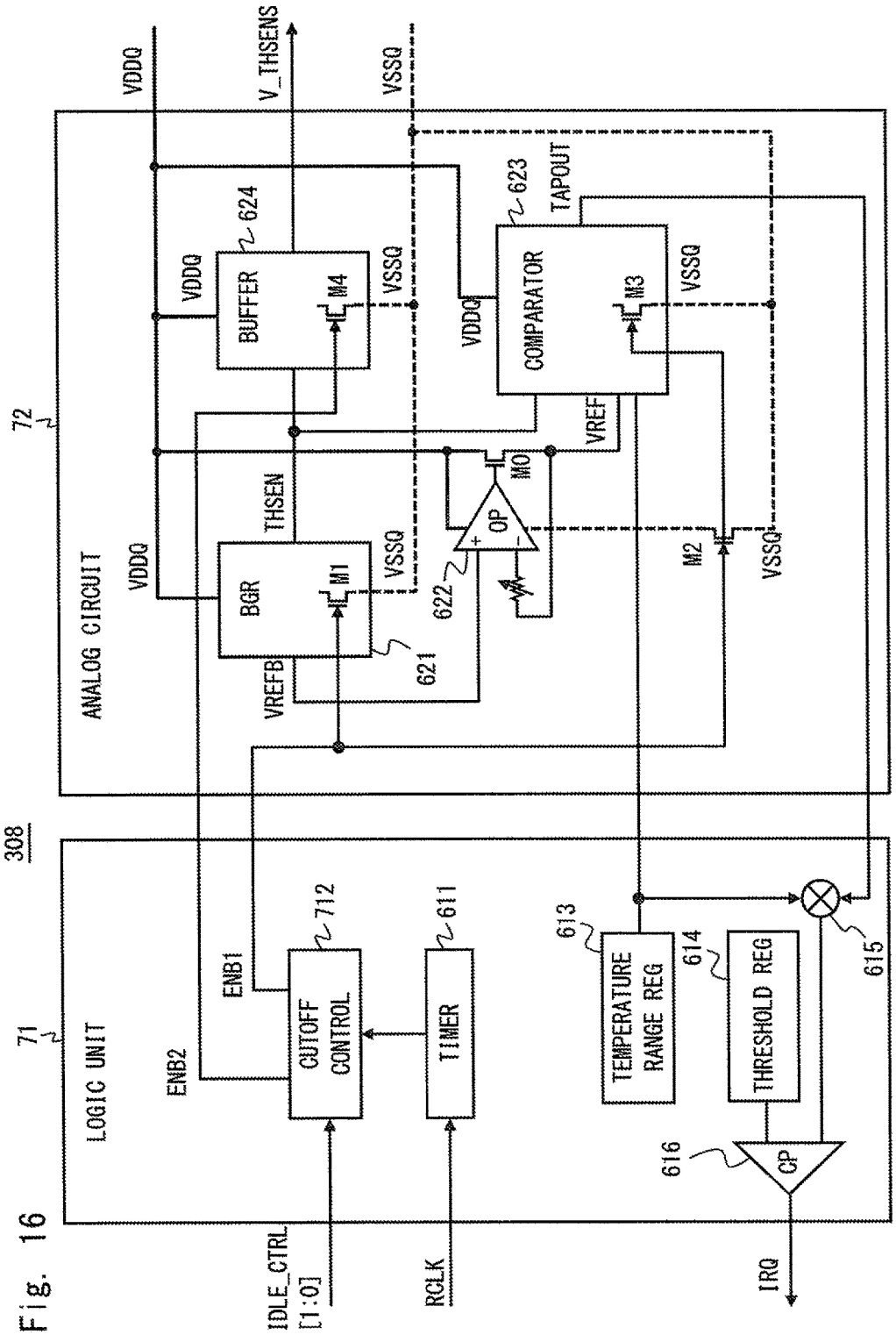
FIG. 16 is a view showing a configuration example of a temperature sensor included in a SoC device according to an embodiment.

FIG. 16 is a diagram showing a configuration example of the on-chip temperature sensor 308 according to this embodiment. The temperature sensor 308 shown in FIG. 14 includes a control logic unit 71 and an analog circuit 72. The configuration of the analog circuit 72 shown in FIG. 16 may be the same as that of the analog circuit 62 shown in FIGS. 7 and 8. Note that, however, in the analog circuit 72 of FIG. 16, on/off of the power supply switch M4 placed in the output buffer 624 is controlled by a second enable signal ENB2, which is different from a first enable signal ENB1 that is supplied to the power supply switches M1 to M3 placed in the other analog circuit elements. A cutoff control logic 712 maintains the second enable signal ENB2 to Low level when the output buffer 624 is not used. The cutoff control logic 712 can thereby always turn off the power supply switch M4 to always stop the operation of the output buffer 624 even while the BGR 621, the operational amplifier 622 and the comparator 623 are performing the intermittent operation.

Whether or not to use the output buffer 624 may be specified by an idle control signal (IDLE_CTRL). For example, the idle control signal may be a 2-bit signal. The first bit of the idle control signal may specify the operation mode (e.g., the continuous operation or the intermittent operation) of the temperature sensor 308, and the second bit may specify whether the output buffer 624 needs to operate or not.

Third Embodiment

In this embodiment, a modified example of the operation mode switching of the temperature sensor 208 that is described in the first embodiment is described. In the first embodiment, the example of switching the operation mode (e.g., switching between the continuous operation and the intermittent operation, or switching between the intermittent operations at different time intervals) of the temperature sensor 208 in response to a change in the operation state of the SoC device 20 is described. However, the operation mode switching of the temperature sensor 208 may be made based on other conditions. In this embodiment, an example of switching the operation mode of the temperature sensor 208 according to a time rate of change of the chip temperature is described. Specifically, according to a time rate of change of the chip temperature, the temperature sensor 208 according to this embodiment switches from the continuous operation in which it continuously measures the chip temperature to the intermittent operation in which it intermittently measures the chip temperature, or changes the time interval for intermittently measuring the chip temperature. Note that the configuration examples of the temperature sensor, the SoC device and the wireless communication terminal according to this embodiment may be the same as those of the first embodiment. Thus, the description of those is omitted in this embodiment. Further, the same reference symbols as those in the first embodiment are used in the description of this embodiment.

Figure 17:
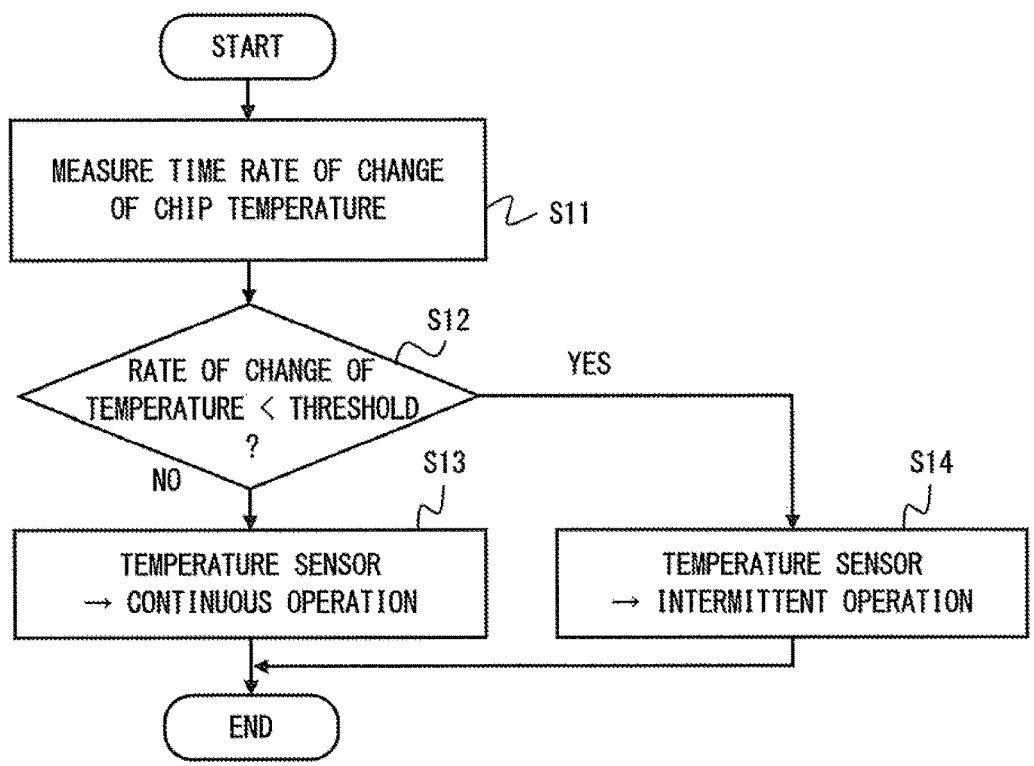
FIG. 17 is a flowchart showing one example of an operation mode switching procedure of a temperature sensor included in a SoC device according to an embodiment.

FIG. 17 is a flowchart showing one example of an operation mode switching procedure of the temperature sensor 208 according to this embodiment. In Step S11, the application processor (CPU) 201 monitors a time rate of change of the chip temperature of the semiconductor chip 200 measured by the temperature sensor 208. In Step S12, the application processor 201 determines whether the amount of change over time (rate of change) of the chip temperature is below a specified threshold or not. When the rate of change of the chip temperature is equal to or more than the threshold (NO in Step S12), the application processor sets the operation mode of the temperature sensor 208 to "continuous operation" (Step S13). On the other hand, when the rate of change of the chip temperature is less than the threshold (YES in Step S12), the application processor sets the operation mode of the temperature sensor 208 to "intermittent operation" (Step S14).

Note that the operation mode of the temperature sensor 208 that is determined in Step S13 of FIG. 17 may be the intermittent operation mode at a shorter time interval than in Step S14, instead of the continuous operation. Further, in Step S102 of FIG. 17, it may be determined whether the chip temperature is in substantially steady state or not. The substantially steady state may be a state where the chip temperature converges within the range of the measurement accuracy of the temperature sensor 208. Further, although the application processor 201 determines the rate of change in the chip temperature and determines the operation mode change of the temperature sensor 208 in the example of FIG. 17, this processing may be autonomously performed by the temperature sensor 208. Specifically, the control logic unit 61 of the temperature sensor 208 may autonomously switch the operating interval of the analog circuit 62 according to the rate of change of the chip temperature.

A large time variation of the chip temperature means that the possibility of thermal runaway is high due to a sharp increase in the chip temperature. On the other hand, a small time variation of the chip temperature means that a sharp increase in the chip temperature is not likely to occur. Accordingly, the on-chip temperature sensor 208 according to this embodiment dynamically changes the operating interval of the analog circuit 62 for measuring the chip temperature, according to a time rate of change of the chip temperature. To be specific, the temperature sensor 208 may increase the intermittent operating interval of the analog circuit 62 for measuring the chip temperature as a time rate of change of the chip temperature decreases. In other words, the on-chip temperature sensor 208 may lengthen the stop time of the analog circuit 62 as a time rate of change of the chip temperature decreases. It is thereby possible to reduce power consumption of the temperature sensor 208 in the situation where sudden thermal runaway is not likely to occur because the rate of change of the chip temperature over time is small. Accordingly, in this embodiment, it is possible to reduce power consumption of the temperature sensor 208 while reliably measuring the chip temperature by the temperature sensor 208 according to change of the chip temperature.

Note that the operation mode switching of the temperature sensor 208 according to the rate of change of the chip temperature described in this embodiment may be performed regardless of the operation state of the SoC device 20, or may be performed only when the SoC device 20 is in a specific operation state. For example, the operation of this embodiment may be performed when the SoC device is in the first operation state (e.g., the maximum operating state, the normal operating state). Even when the SoC device 20 is in the first operation state, the rate of increase in the chip temperature is low under the condition where the ambient temperature Ta is sufficiently low. In this embodiment, it is then possible to reduce power consumption of the SoC device 20 regardless of a change in the operation state of the SoC device 20.

Other Embodiments

The first to third embodiments can be combined as appropriate.

Although a SoC device for a wireless communication terminal is mainly described in the first to third embodiments, the configuration and operation of the SoC device including the on-chip temperature sensor described in those embodiments may be applied widely to SoC devices for other electronic systems (e.g., a digital camera, a digital television, or an audio player). Further, although a SoC device is mainly described in the first to third embodiments, the configuration and operation of the on-chip temperature sensor described in those embodiments may be applied widely to ICs having the on-chip temperature sensor.

Further, the above-described embodiments are merely an exemplification of application of the technical idea obtained by the inventors of this application. The technical idea is not limited to the above-described embodiments, and various changes and modifications may be made as a matter of course.

REFERENCE SIGNS LIST

20 SoC (SYSTEM ON A CHIP) DEVICE
21 POWER MANAGEMENT IC (INTEGRATED CIRCUIT)
22 RF (RADIO FREQUENCY) UNIT
23 DISPLAY
24 INPUT DEVICE
25 CAMERA
26 MICROPHONE
27 SPEAKER
28 EXTERNAL MEMORY
61 LOGIC UNIT
62 ANALOG CIRCUIT
71 LOGIC UNIT
72 ANALOG CIRCUIT
100 WIRELESS COMMUNICATION TERMINAL
101 ENCLOSURE
102 DISPLAY
103 TOUCH PANEL
104 OPERATION BUTTON
105, 106 CAMERAS
200 SEMICONDUCTOR CHIP
201 APPLICATION PROCESSOR (OR CPU (CENTRAL PROCESSING UNIT))
202 IMAGE PROCESSOR
203 BASEBAND PROCESSOR
204 AUDIO CODEC
205 DISPLAY CONTROLLER
206 MEMORY CONTROLLER
207 MEMORY
208 TEMPERATURE SENSOR
209 TEMPERATURE SENSOR
210 SYSTEM CONTROL LOGIC
211 ANOTHER IP (INTELLECTUAL PROPERTY) CORE
212 BUS
213, 214 PADS
281 SYSTEM SOFTWARE
611 TIMER
612 CUTOFF CONTROL LOGIC
613 TEMPERATURE RANGE REGISTER
614 THRESHOLD REGISTER
615 MULTIPLIER
616 COMPARATOR
621 TEMPERATURE SENSOR ELEMENT (BGR (BAND GAP REFERENCE))
622 OUTPUT BUFFER
623 COMPARATOR
624 OPERATIONAL AMPLIFIER
712 CUTOFF CONTROL LOGIC
2011, 2012, 201N POWER SUPPLY AREAS
6231 TO 6234 COMPARATOR ELEMENTS
M1 TO M4 ANALOG SWITCHES
V1 TO V5 POWER SUPPLY LAYERS

The invention claimed is:

1. A semiconductor device comprising:
a semiconductor chip in which a CPU (Central Processing Unit), a functional block, and a first temperature sensor are integrated,
wherein the first temperature sensor is configured to measure a chip temperature of the semiconductor chip in a first operation state of the semiconductor device and in a second operation state of the semiconductor device, power consumption in the second operation state of the semiconductor device being lower than power consumption in the first operation state of the semiconductor device, and
wherein, in response to a change in the operation state of the semiconductor device from the first operation state to the second operation state, the first temperature sensor operates to switch either from a continuous operation in which the first temperature sensor continuously measures the chip temperature to an intermittent operation in which the first temperature sensor intermittently measures the chip temperature, or from an intermittent operation in which the first temperature sensor intermittently measures the chip temperature at a first time interval to another intermittent operation in which the first temperature sensor intermittently measures the chip temperature at a second, different time interval,
the semiconductor device further comprising a second temperature sensor integrated in the semiconductor chip and configured not to measure the chip temperature during the second operation state,
wherein
the functional block includes a first functional block that operates to consume power during the second operation state and a second functional block that suppresses its operation to reduce power consumption during the second operation state,
the first temperature sensor is placed adjacent to the first functional block, and the second temperature sensor is place adjacent to at least one of the CPU and the second functional block.

2. The semiconductor device according to claim 1, wherein
the first temperature sensor includes an analog circuit configured to generate a sensor signal based on the chip temperature and a control logic unit configured to generate a control signal to be supplied to the analog circuit,
the analog circuit includes at least one analog circuit element and a power supply switch placed on a current path of the at least one analog circuit element, and
the power supply switch operates to intermittently cut off the current path in response to the control signal.

3. The semiconductor device according to claim 1, wherein
the semiconductor device is configured to switch between the first operation state and the second operation state,
during the first operation state, the first temperature sensor operates to continuously measure the chip temperature or intermittently measure the chip temperature at the first time interval, and
during the second operation state, the first temperature sensor operates to intermittently measure the chip temperature at the second time interval which is longer than the first time interval.

4. The semiconductor device according to claim 3, wherein
both the CPU and the functional block operate to consume power during the first operation state, and
both the CPU and the second functional block suppresses its operation to reduce power consumption during the second operation state.

5. The semiconductor device according to claim 1, wherein the first temperature sensor is placed adjacent to the CPU and the first functional block.

6. The semiconductor device according to claim 1, wherein an area ratio of at least one of the CPU and the functional block to an area of the semiconductor chip is equal to or more than 5 percent.

7. The semiconductor device according to claim 1, wherein the CPU or the functional block is a functional block having the highest power consumption in the semiconductor chip.

8. The semiconductor device according to claim 1, wherein the first functional block includes a baseband processor for wireless communication that performs discontinuous reception during the second operation state.

9. The semiconductor device according to claim 1, wherein, according to a time rate of change of the chip temperature, the first temperature sensor operates to switch from a continuous operation that continuously measures the chip temperature to an intermittent operation that intermittently measures the chip temperature or change a time interval for intermittently measuring the chip temperature.

10. An electronic apparatus comprising:
The semiconductor device according to claim 1; and
a radio frequency (RF) unit connected to the semiconductor device.

* * * * *